(12) United States Patent
Chan et al.

(10) Patent No.: US 9,048,987 B2
(45) Date of Patent: Jun. 2, 2015

(54) JOINT DETECTOR/ DECODER DEVICES AND JOINT DETECTION/ DECODING METHODS

(71) Applicant: Agency for Science, Technology and Research, Singapore (SG)

(72) Inventors: Kheong Sann Chan, Singapore (SG); Moulay Rachid Elidrissi, Singapore (SG); Sari Shafidah Bte Shafiee, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 0 days.

(21) Appl. No.: 14/058,150

(22) Filed: Oct. 18, 2013

(65) Prior Publication Data

US 2014/0219398 A1    Aug. 7, 2014

Related U.S. Application Data

(60) Provisional application No. 61/715,302, filed on Oct. 18, 2012.

(51) Int. Cl.
*H04L 1/00* (2006.01)

(52) U.S. Cl.
CPC ............ *H04L 1/0045* (2013.01); *H04L 1/0063* (2013.01)

(58) Field of Classification Search
CPC ..... H04L 1/005; H04L 1/0045; H04L 1/0063; H04L 25/03331; G11B 20/10296
USPC .......... 375/262, 265, 316, 340, 341; 714/794, 714/795, 796
See application file for complete search history.

(56) References Cited

U.S. PATENT DOCUMENTS

| 7,502,418 B2 * | 3/2009 | Azadet et al. ................ 375/265 |
| 2007/0116143 A1 * | 5/2007 | Bjerke et al. ................ 375/262 |

OTHER PUBLICATIONS

Joachim Hagenauer, et al., "A Viterbi Algorithm with Soft-Decision Outputs and its Applications," Proc. IEEE Global Telecommunications Conference, Dallas, Texas, pp. 1680-1686, (Nov. 1989).
L. R. Bahl, et al, "Optimal Decoding of Linear Codes for Minimizing Symbol Error Rate" IEEE Transactions on Information Theory, vol. IT-20, pp. 284-287, (Mar. 1974).
Hongwei Song, et al., "Low-Density Parity-Check Codes for Partial Response Channels", IEEE Signal Processing Magazine, pp. 56-66, (Jan. 2004).
Giulio Colavolpe, et al., "On the Application of Factor Graphs and the Sum—Product Algorithm to ISI Channels", IEEE Transactions on Communications, vol. 53, No. 5, pp. 818-825, (May 2005).

(Continued)

*Primary Examiner* — Leon Flores
(74) *Attorney, Agent, or Firm* — Blakely, Sokoloff, Taylor & Zafman LLP

(57) ABSTRACT

According to various embodiments, a joint detection/decoder device may be provided. The detector and decoder device may include: an input circuit configured to receive an input signal; a survivor splitting circuit configured to produce a plurality of survivors of a next instance based on at least one survivor of a previous instance and based on the input signal; and a survivor discarding circuit configured to discard survivors based on a set of predetermined criteria; wherein each survivor has an associated bit sequence.

16 Claims, 22 Drawing Sheets

(56) References Cited

OTHER PUBLICATIONS

Alessandro Tomasoni, et al., "Non-Binary Message-Passing Algorithms for Magnetic Channels with Data-Dependent Noise", Annual Congress GTTI 2008—Session: Digital Transmissions, 8 pgs., (2008).

Mohammad H. Taghavi, et al., "Graph-Based Decoding in the Presence of ISI", IEEE Transactions on Information Theory, vol. 57, No. 4, pp. 2188-2202, (Apr. 2011).

H J Richter, "The Transition from Longitudinal to Perpendicular Recording", Journal of Physics D: Applied Physics, vol. 40, pp. R149-R177, (2007).

* cited by examiner

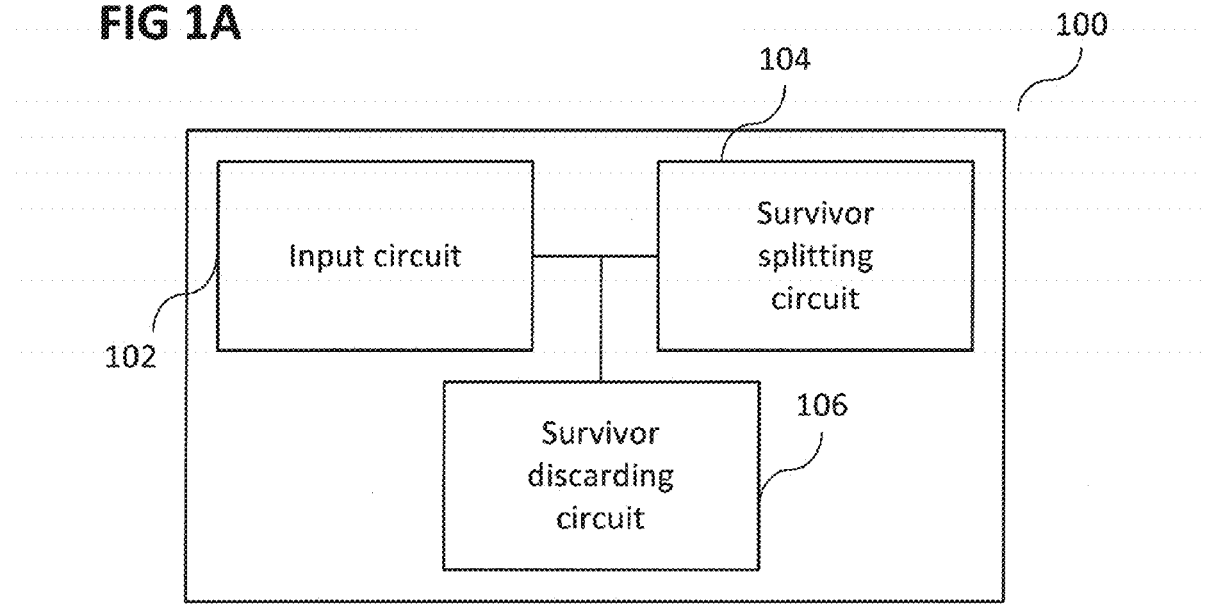
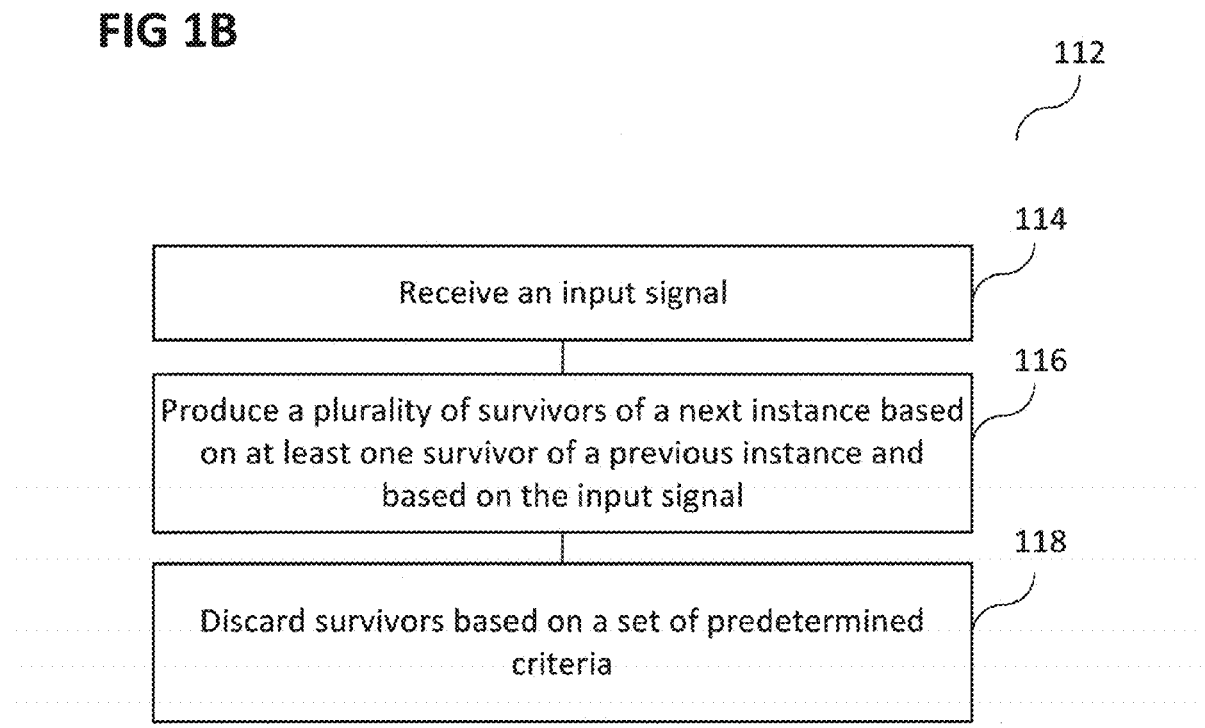

JOINT DETECTOR/ DECODER DEVICES AND JOINT DETECTION/ DECODING METHODS

CROSS-REFERENCE TO RELATED APPLICATIONS

The present application claims the benefit of the U.S. provisional patent application No. 61/715,302 filed on 18 Oct. 2012, the entire contents of which are incorporated herein by reference for all purposes.

TECHNICAL FIELD

Embodiments relate generally to joint detection/decoder devices and joint detection/decoding methods.

BACKGROUND

Detection and decoding of a received signal is a task that is performed in every receiver. Thus, there may be a need for efficient detection and efficient decoding. The detector and decoder exist within the context of a channel, be it a communications channel, or a recording channel, or any case where information (bits) are transmitted over a noisy channel. An encoder is needed on the transmitting side to protect the bits from noise and the detector and decoder work on the receiving end to get back the original bits. The context will further become apparent from FIG. 2, like it will be described below.

SUMMARY

According to various embodiments, a joint detection/decoding device may be provided (while the commonly used devices include a detector and a separate decoder). The detector and decoder device may include: an input circuit configured to receive an input signal; a survivor determination circuit configured to determine a plurality of survivors of a next instance based on at least one survivor of a previous instance and based on the input signal, wherein each survivor has an associated metric and bit sequence. The survivor processing circuit may be configured to determine whether the survivor of the current instance propagates to the subsequent instance if it fulfills a pre-determined validity criterion. It may be primarily the metric like will be described in more detail below that determines survivor propagation. The metric may be computed based on all the survivor's bit sequence.

According to various embodiments, a joint detection/decoding method may be provided. The joint detection/decoding method may include: receiving an input signal; determining a plurality of survivors of a next instance based on at least one survivor of a previous instance and based on the input signal, wherein each survivor splits into 2 new survivors, one corresponding to the appending of a + bit and one corresponding to the appending of a − bit. The survivors of the next instance then undergo a selection process in which the survivor is kept if the survivor's metric fulfills a pre-determined validity criterion, it is discarded otherwise.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1A shows a joint detector/decoder device according to various embodiments;

FIG. 1B shows a flow diagram illustrating a joint detection/decoding method according to various embodiments;

DESCRIPTION

Figure 2:
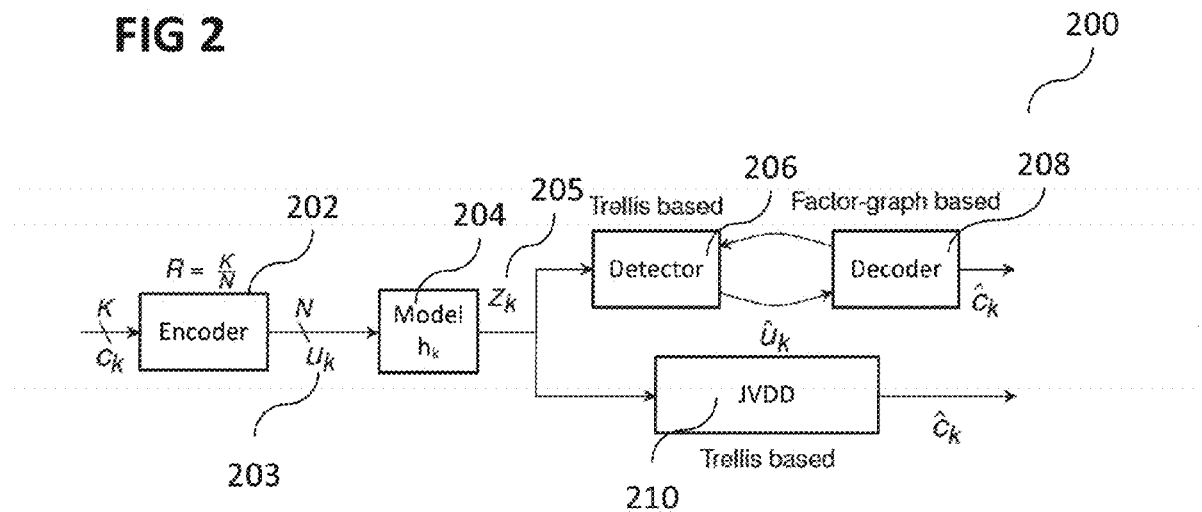
FIG. 2 shows a communication system block diagram according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the detector and decoder device as described in this description may include a memory which is for example used in the processing carried out in the detector and decoder device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Detection and decoding of a received signal is a task that is performed in every receiver. Thus, there may be a need for efficient detection and efficient decoding.

Communication channels today may commonly use an iterative detector/decoder system on its receiver end to detect and decode the transmitted bits. This iterative detection system may include a soft output detector, such as the soft output Viterbi algorithm (SOVA) or the Bahl, Cocke, Jelinek and Raviv (BCJR) algorithm, and an LDPC (low-density parity check) decoder such as the Sum Product Algorithm (SPA). Although iterations of the soft information between these detector and decoder blocks gives rise to good performance over an inter-symbol-interference (ISI)/additive white Gaussian noise (AWGN) channel when the codeword length (CWL) is large, the iterative detector is sub-optimal. The suboptimality originates from the SPA algorithm that itself is suboptimal whenever there are cycles in the factor graph, in particular, when there are short cycles. Any practical code will have cycles in its factor graph, although in practice, effort is invested to eliminate the short cycles. A second source of suboptimality is the iterative process which tends to improve incrementally with diminishing returns, as the number of iterations increases. Development of iterative detection and decoding schemes has brought about significant improvements to communication systems in recent years. In the conventional iterative detector, a soft-output detector such as the Soft Output Viterbi Algorithm (SOVA), or the Bahl, Cocke, Jelinek, Raviv (BCJR) algorithm is executed over a trellis followed by the Sum Product Algorithm (SPA) which runs on a factor graph (FG). A typical communication block diagram is illustrated on the upper part of FIG. 2, while the competing joint Viterbi detector/decoder (JVDD) method according to various embodiments is shown in the lower part of FIG. 2. While the iterative detector has good performance over inter-symbol interference (ISI)/additive white Gaussian noise (AWGN) channels, it is suboptimal. This suboptimality originates from a couple sources. Firstly the SPA is suboptimal whenever the coding FG has cycles, in particular, it performs quite poorly when the FG has short cycles. In practice, all code FGs have cycles, although effort is invested to remove the short cycles from the code. Secondly the iterative process itself induces suboptimality. This can be observed from the fact that additional iterations in the detector yield improved performance, demonstrating that at the end of each iteration, performance is suboptimal. Iterations occur both within the SPA decoder and between the soft-output detector and the SPA decoder, so these are both sources of suboptimality.

These sources of suboptimality in the current iterative detector motivate the search for schemes that have a chance of achieving optimality. Joint detection/decoding is a promising candidate. In a previous example of joint detection/decoding, the softoutput detector from a trellis-based algorithm may be converted to a FG based algorithm, and the SPA may be used over it. The detector FG and decoder FG can then be combined into a joint FG representing both the detector and decoder, and the SPA can be run over it. It was found that the performance of the detector implemented on a FG does not outperform the BCJR or SOVA algorithms, as both are optimal over the ISI/AWGN channel. According to various embodiments, the opposite approach may be provided: instead of converting the optimal trellis-based SOVA/BCJR to a FG, the joint detector/decoder over a trellis may be provided. This may be the approach of the JVDD according to various embodiments. This approach may have the advantage that it replaces the suboptimal SPA algorithm with the optimal Viterbi algorithm and does away with all iterations. Thus the JVDD addresses both above-mentioned sources of suboptimality in the iterative detector.

According to various embodiments, a joint detection and decoding may be provided as opposed to the more commonly used iterative detection and decoding that conventional channels employ. Joint detection/decoding means that the detection and decoding are done on a single structure (the trellis, like will be described below). Iterative detection/decoding means that detection is done first on one structure (the trellis), and the output probabilities are passed to the decoder which does decoding on another structure (a factor graph) and information is iterated back and forth between these two structures. Iterative detection/decoding is more commonly used today.

FIG. 1A shows a joint detector/decoder device 100 according to various embodiments. The joint detector/decoder device 100 may include an input circuit 102 configured to receive an input signal. The joint detector/decoder device 100 may further include a survivor splitting circuit 104 configured to produce a plurality of survivors of a next instance based on at least one survivor of a previous instance and based on the input signal. The joint detector/decoder device may further include a survivor discarding circuit 106 that discards survivors according to a set of predetermined criteria. Each survivor may have an associated a bit sequence.

Each time step, each existing survivor is split into 2 new survivors, 1 obtained by appending a + and 1 obtained by appending a −. The corresponding metrics are also computed. This doubles the number of survivors per time-step. In order to keep the number of survivors from becoming unmanageable, survivors also need to be killed at each time-step (hence their name: survivors). They are killed either a) if their metrics are too large (above the threshold), or b) if they fail the parity checking criterion. The discarding circuitry is where the decisions are made and where various criteria come into play. There is no decision or criteria during splitting. The normal Viterbi also splits survivors, then discards the larger survivor at each node at each time-step. In the normal Viterbi, this has the effect to double, then half the number of survivors each step, while in the JVDD, it doubles, then reduces, (but not necessarily halves) the number of survivors each step.

In other words, the joint detector/decoder device 100 may determine a candidate set (which may include a plurality of survivors, as will be described in more detail below), and for these plurality of survivors may determine, whether they are valid under a pre-determined code (202, like will be described with reference to FIG. 2 below).

According to various embodiments, the joint detector/decoding device firstly creates survivor paths by splitting existing survivors. Then, this set of survivors may be restricted, for example based on a comparison of the survivors' metric with a threshold or by retaining a certain predefined number of minimum metric survivors. In this way, survivors are propagated down the trellis by splitting and then curtailing their numbers either via the comparison of their metric to a predetermined threshold, or cropping survivors more than a certain predetermined number. An alternative method to restrict the number of survivors is through the design of the code (202).

The splitting part may be common to both JVDD and Viterbi. The curtailing part is what differentiates them and causes the JVDD to only return legal codewords. According to various embodiments, the survivor splitting circuit 104 and the survivor discarding circuit 106 may further be configured to determine whether a survivor propagates to the next time instance. The survivor may have an associated bit sequence, and metric. The metric may be computed from the bit sequence, from the channel coefficients and from readback waveform. (like will be described in more details below). The JVDD algorithm splits and curtails survivors according to the criteria based on the metric computed for each survivor. For example, the survivor discarding circuit 106 may be configured to determine that a survivor survives to the next time instance if the metric of the survivor is within a pre-determined metric threshold. The absolute threshold may be tied to the minimum metric of each node. Each node in the trellis has survivors ending on it. One of the survivors at each node has the minimum metric. Other survivors which are above this minimum metric by more than the threshold may be discarded. The absolute value of the threshold changes with the minimum metric survivor of that node. Thus, it will be understood that "within" means that the survivor's metric needs to be within the threshold value of the minimum metric of that node.

According to various embodiments, the survivor splitting circuit 104 and the survivor discarding circuit 106 may be further configured to retain a predetermined number of survivors with the smallest metrics as the plurality of survivors of the next instance.

According to various embodiments, the pre-determined validity criterion may be based on whether the survivor's bit pattern satisfies the checks of a parity check matrix.

According to various embodiments, the parity check matrix may include or may be a matrix with entries of zero above a pre-determined sub-diagonal of the parity check matrix.

According to various embodiments, the survivor splitting circuit 104 and the survivor discarding circuit 106 may be configured to, during a metric thresholding section, determine whether a survivor carries on to the next instance based on a metric of the bit sequence and independent from whether the bit sequence fulfills a pre-determined validity criterion According to various embodiments, the survivor determination circuit may be configured to, during a parity check section, determine whether a survivor carries on to the next instance based on a metric of the bit sequence and based on whether the bit sequence fulfills a pre-determined validity criterion.

According to various embodiments, the metric may include or may be an Euclidean metric, for example the Euclidean distance between the noise-free waveform and the received waveform.

The joint Viterbi detector/decoder device tries to find, from the plurality of candidate survivors, the survivor that corresponds to a bit sequence that is a legal codeword (according to the parity check matrix) and simultaneously has the minimum metric (as defined by the Viterbi algorithm and thresholding). The device may try to find the minimum metric legal codeword (MMLC) from amongst all the competing survivor paths. There is only 1 MMLC, and the device is trying to find it. If it succeeds, it makes the optimum decision FIG. 1B shows a flow diagram 112 illustrating a joint detection/decoding method according to various embodiments. In 114, an input signal may be received. In 116, a plurality of survivors of a next instance may be produced based on at least one survivor of a previous instance and based on the input signal. Each survivor may have an associated bit sequence. In 118, survivors may be discarded based on a set of predetermined criteria (in other words: it may be determined that a survivor is carries on to the next instance if its metric fulfills a pre-determined validity criterion).

According to various embodiments, the joint detection/decoding method may further include determining that a survivor survives to the next instance if the metric of the survivor is within a pre-determined metric threshold.

According to various embodiments, joint detection/decoding method may further include retaining a predetermined number of survivors with the smallest metrics as the plurality of survivors of the next instance.

According to various embodiments, the pre-determined validity criterion may include or may be a parity check based on whether the survivor's bit pattern satisfies the checks of a parity check matrix.

According to various embodiments, the parity check matrix may include or may be a matrix with entries of zero above a pre-determined sub-diagonal of the parity check matrix.

A devices according to various embodiments may be referred to as Joint Viterbi Detector Decoder (JVDD). According to various embodiments, a Joint Viterbi Detector Decoder (JVDD) may be provided. According to various embodiments, joint detection and decoding may be provided.

FIG. 2 shows an example communication system block diagram 200. The communication system 200 may include an encoder 202, an AWGN/ISI model with channel coefficients $h_k$ 204. A commonly used iterative detector/decoder including a detector 206 and a decoder 208 is shown on the top. The proposed joint Viterbi detector decoder 210 is shown on the bottom. The encoder 202 is on the transmitting side and encodes the data. The channel transmits the data. The iterative detector 206 and decoder 208 is the prior art embodiment and the joint detector and decoder 210 according to various embodiments is the newly proposed competing receiver. The iterative detector/decoder does detection and decoding separately while the joint detector/decoder does them together. For example, in the commonly used device, the detector 206 may be configured in accordance with the SOVA (soft output Viterbi Algorithm) or with the BCJR algorithm. For example, the decoder 208 may be a SPA decoder. The BCJR/SOVA detector and the SPA decoder form the prior-art iterative detector/decoder. The bottom path, the joint Viterbi detector/decoder forms the device according to various embodiments. In other words, the upper portion of FIG. 2 including the detector 206 and the decoder 208 shows a conventional prior-art iterative detector/decoder, while the lower portion of FIG. 2 shows the proposed JVDD according to various embodiments.

In the prior-art iterative detector shown in FIG. 2, the detector block 206 has knowledge of the channel while the decoder 208 has knowledge of the code. Information is iterated between the detector 206 and the decoder 208 until a sufficiency criterion has been met. The JVDD block 210 according to various embodiments has knowledge of both the channel and the code to do detection and decoding jointly. This information is used to decide which paths to keep and which to discard within the JVDD trellis, as will be described below. According to various embodiments, the JVDD approach may be applied to coded data transmission over noisy ISI channels. How the method is formulated and how to address practical issues associated with it will be described in more detail below.

In the following, the Joint Viterbi Detector/Decoder (JVDD) method and devices according to various embodiments will be described.

The JVDD according to various embodiments may operate on a trellis, similar to the regular Viterbi algorithm.

Figure 3:
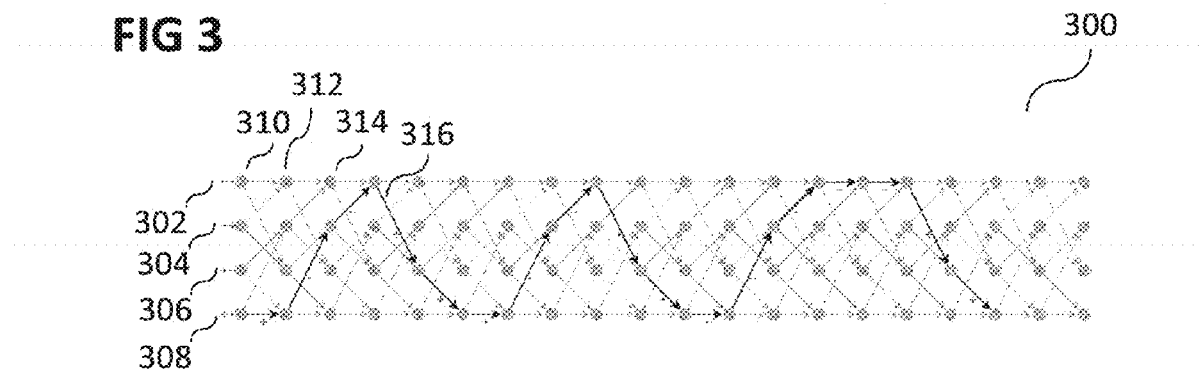
FIG. 3 shows an illustration of a trellis used by the Viterbi algorithm according to various embodiments.

FIG. 3 shows an illustration 300 of a prior-art Viterbi trellis with 4 states corresponding to the − − (302) − + (304), + − (306) and + + (308) states of the channel. In the trellis, the vertical direction corresponds to different states of the channel while the horizontal direction (the − − state of the first four time instances 310, 312, 314, 316 are exemplary labeled) corresponds to time evolution of the bit sequence. The paths through the trellis thus correspond to the time-evolution of the state of the channel. The state of the channel is determined by the bit sequence into the channel 203 as shown in FIG. 2. A survivor path (exemplary labeled as 316) through the trellis corresponds to a bit sequence into the channel. Each survivor path has a corresponding survivor metric computed as the summation of the metrics of each branch making up the survivor, referred to as the branch metrics. Each branch metric is computed as the Euclidean distance between the observation $z_k$ (205) at that time instance and the noise-free value of the channel output for the given bit sequence input defined by the channel state. If the branch metric is labeled $b_k$, then $b_k=(z_k-s_k)^2$ where $z_k$ is the readback observation at time k (205), $s_k$ is the noise-free channel output for the given branch transition defined by the state from which and to which the transition (an exemplary transition is given by state 302 at time k to state 306 at time k+1) is occurring. Each transition has its own noise-free value computed from the channel coefficients $h_k$ 204. The survivor metric is formed by summing the branch metric for each branch forming the survivor:

$$m_k = \sum_{i=0}^{k} b_i.$$

The Viterbi algorithm compares two incoming survivor metrics at a given node at a given time instant k and discards the larger. The JVDD algorithm compares multiple incoming survivor metrics at a given node at a given time instant k. and discards those survivors whose metrics are larger than the minimum metric by the predefined threshold. An example of a survivor path through the trellis is shown in FIG. 3 (316). For ease of discussion, we enumerate the states as 0: – –, 1: – +, 2: + – and 3: + +. The survivor shown in 316 starts at state 3 and transitions to states 3, 1, 0, 2, 3, 3, 1, 0 . . . etc. . . . corresponding to the sequence of bits shown associated with survivor. The survivor has an associated metric that is a quantitative measure of how close, in the Euclidean distance sense, the survivor's noise-free waveform is to the actual waveform. The prior-art Viterbi algorithm returns the smallest metric waveform by discarding all larger metric survivors at each step in the trellis. The prior-art Viterbi trellis starts with 4 survivors, 1 in each of the 4 states. The Viterbi trellis is terminated by flushing the channel with enough known bits to clear its memory and return the trellis to a known state. Typically this known state is the 0 state, and the channel must be flushed with – bits to return it to a known state of all –'s. Before the channel is terminated (returned to the all-zero state), there will be N survivors any of which could be minimum metric survivor path. After the channel is returned to a known state, a single minimum metric survivor which may then be passed as the output of the algorithm.

The JVDD according to various embodiments has knowledge of the code, may behave similarly to the prior-art Viterbi algorithm in the metric thresholding section 402 (as will be described below). The JVDD must also have information on the code in the form of the parity check matrix H. Without information about the code, it cannot return a legal codeword. In the parity checks section 404 (as will be described below), survivor paths are additionally checked against the parity check equations: $cH^T=0$ where c is the 1×N codeword vector, H is the M×N parity check matrix and 0 is the 1×M vector zeros. Survivor paths that fail the parity check are discarded in the trellis. The JVDD aims to return the legal codeword that produces the waveform closest to the received waveform in the Euclidean distance sense. However, it may no longer be correct to discard all paths with larger metrics as was done in the prior-art Viterbi algorithm, when the parity checking function 404 is included. A smaller metric path may not belong to legal codeword and discarding all paths with larger metrics in the metric thresholding section 402 may end up discarding the MMLC that we are trying to find. Thus in the JVDD, a plurality of survivors are retained subject to the condition that their metrics are within a user defined threshold of the minimum metric path at each node. This reduces the probability of discarding the MMLC to an acceptably low level.

Figure 4:
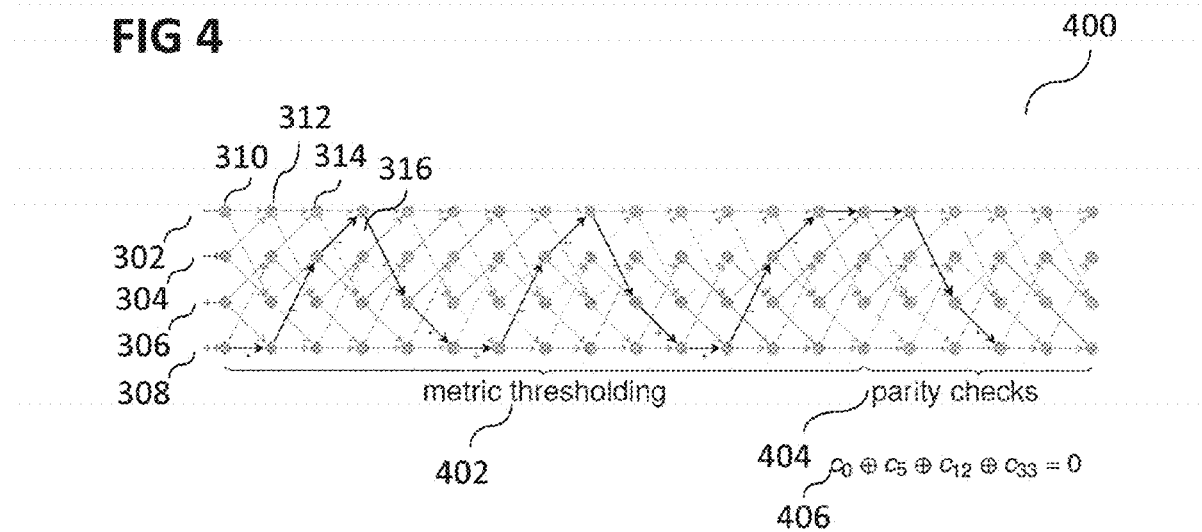
FIG. 4 shows an illustration of a trellis used by the JVDD algorithm according to various embodiments.

FIG. 4 shows an illustration 400 of the JVDD trellis like shown in FIG. 3, so that the same reference signs may be used and duplicate description may be omitted. In FIG. 4, the JVDD trellis is divided into two sections. In the metric thresholding section 402, channel bits may be detected in similar fashion to the commonly used Viterbi algorithm, but using a threshold rather than a direct comparison without threshold. Metrics may be computed in the same way as with the Viterbi algorithm, and survivors with metrics larger than the minimum metric by the user-defined threshold may be discarded. In the parity bit section 404, additional computations are performed whenever the bit index corresponds to the last one in any row of the parity check matrix H. The parity check for each survivor is evaluated, for example like indicated in 406 by tracing back the survivor and obtaining the bits involved in the parity check, and the survivor is discarded if it violates the parity check for that row of the parity check matrix H. Thus at the end of the trellis, only survivors that pass all parity checks, and that correspond to legal codewords may make it through.

It may be recalled that H is an M×N matrix (which may be called the parity check matrix) where M is the number of parity checks and N is the number of channel bits. Each row of H corresponds to one of the M parity checks and the syndrome check equation for a single row (check) of H can be written as $ch_i^T=0$, where $h_i$ is the ith row of H. This check on the ith row of H can occur during the JVDD algorithm at the time when the channel bit corresponding to the last "1" in $h_i$ is detected. Hence the checks in the JVDD parity-checks section occur at nodes that correspond to the last "1" of a row in the parity check matrix H. The region in which these parity checks occur is labeled the "parity check" section 404 of the trellis in FIG. 4 and in general, tends to happen towards the end of the trellis, since that is typically where the last "1" in each row tend to be clumped. It is to be understood that even in the parity check section 404, the Viterbi metric computation and threshold comparison may still be carried out and survivors may still be considered, like in the metric thresholding section 402, but that in addition, the parity check may further eliminate more survivors.

Here it becomes clear that the JVDD algorithm makes use of knowledge of both the channel and of the code corresponding to the operations in the "metric thresholding" section 402 and the "parity bits" section 404 respectively. The operations in the "metric thresholding" section actually occur throughout the entire trellis, including computing metrics and discarding survivors with metrics that exceed the minimum metric by threshold. Correspondingly, the "parity bits" operations actually occur at very specific time-instances in the trellis, for those time indices k corresponding to the last "1" of a particular row in H.

The gist of the design of the JVDD algorithm is to find and return the minimum metric legal codeword (MMLC). We define the MMLC as the legal codeword (according to the parity check matrix H) with the smallest metric as computed in the metric thresholding section 402. It can be seen that the JVDD attempts to achieve this through the two previously mentioned sections of the trellis. The minimum-metric part is addressed by the "metric thresholding" section and the legal-codeword part is addressed by discarding all survivors that violate the codeword constraint in the "parity checks" section.

It should be noted that the JVDD does not guarantee to return the MMLC, which may be the optimal decision for a coded AWGN/ISI channel. The JVDD could fail to return the MMLC if the MMLC path acquires a larger metric over a part of the trellis that causes it to be discarded during the threshold comparison with a competing path in the metric thresholding section 402. If any other survivor in the trellis happens to achieve a metric that is more than threshold smaller than the MMLC at any point in the trellis, then the MMLC could be discarded during the metric thresholding section before reaching the parity checking section. Obviously, since it may be desired that the JVDD returns the MMLC, this is undesirable and one way to prevent this may be to use a larger threshold. Larger threshold values produce exponentially more survivors, resulting in greater computational complexity. Hence, it can be seen that the threshold controls the trade-off between the performance and complexity in the JVDD. The JVDD will be suboptimal as long as there is a chance that it is discarding the MMLC, but it becomes optimal with increasing threshold. According to various embodiments, for the JVDD the threshold value may be chosen, and ways may be provided to manage the complexity for reasonable thresholds.

When threshold is large enough, the MMLC is assured to survive to the end of the trellis. As threshold $\to \infty$ (which may mean that no threshold is present, as all metrics would be smaller than the threshold), no survivors are killed in the "metric thresholding" section and the MMLC is sure to make it through both sections to emerge the winning minimum metric survivor from the trellis. However the complexity will approach that of the brute-force detector which computes the metric of every bit pattern. If the threshold parameter happens to kill the MMLC early on in the trellis, then it is possible that no survivors make it through the trellis, i.e. at some point, all survivors end up killed by the parity checks. In this situation, the JVDD has a couple of options. Firstly it can return an error default codeword such as the all-zero codeword. Secondly, it can go back to the start of the trellis, increase the threshold parameter and run the algorithm again.

In the following, describes several parameters that may be used to manage the complexity of the JVDD.

According to various embodiments, a way of managing the number of survivors is by tweaking the threshold parameter. This parameter achieves complexity reduction at a cost to the performance.

According to various embodiments, the maximum number of survivors may be limited.

When a large threshold is needed to prevent discarding of the MMLC, but large complexities are not acceptable, a second complexity-limiting parameter can be introduced that may be called the maxNoSurv parameter. As the name suggests, this is the maximum number of survivors in the algorithm that the JVDD will allow. It is implemented by ordering the list of survivors by their metrics and keeping the maxNoSurv smallest metric survivors at each time-step in the trellis. This is an alternative method of keeping/killing survivors to the threshold parameter. There is also, however, a performance penalty associated with this parameter.

Furthermore, the usage of the threshold and maxNoSurv may be combined. For example, as long as the number of survivors is less than maxNoSurv, threshold may be applied.

In the following, JVDD codes according to various embodiments will be described.

The JVDD can be run using any type of block code and it was initially tested with random LDPC codes. The low-density requirement of LDPC codes comes from the SPA method. The JVDD has no such restriction on the code and high-density parity check matrices can be used if desired. However random codes result in high computational complexity for the JVDD. Here we propose a class of codes that help to manage the complexity of the JVDD by their design.

Figure 5:
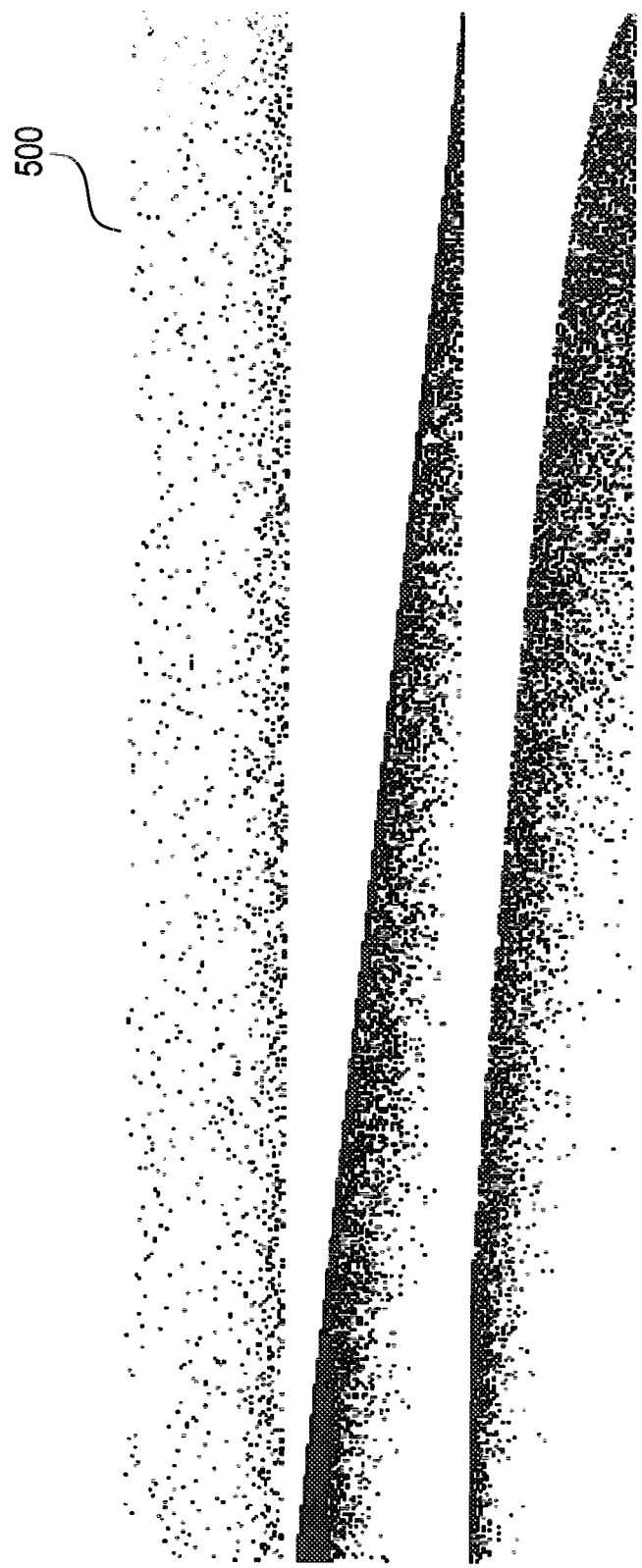
FIG. 5 shows an illustration of various codes for parity check according to various embodiments.

FIG. 5 shows an illustration 500 of three parity check matrices of a random LDPC code on the top (prior art), a sample GDLD (Gaussian Distribution Linear Diagonal) code in the middle (proposed along with the JVDD) and GDPD (Gaussian Distribution Parabolic Diagonal) code on the bottom (proposed along with the JVDD). Black and white pixels represents bits '1' and '0' respectively. From the FIG. 5, it can be seen that the channel bits that correspond to the last '1' in every row of the random parity check matrix (top) are clustered at the end of the matrix. This implies that for such a code, the killing of survivor paths arising from parity checks can only be performed towards the end of the trellis in the JVDD. The growth in the number of survivor paths in the trellis prior to this may have been exponential, resulting in a surge in computational complexity. Although the JVDD can be used with any code, in order to have viable complexity, codes such as random LDPC codes should be avoided with the JVDD when the CWL is long. Short CWLs (code word lengths) are less of a problem as the number of survivors does not have enough time to grow too large.

Two sub-classes of JVDD codes may be provided for the JVDD. They are the GDLD and GDPD codes. The parity check matrix of a GDLD code is illustrated in the middle part of FIG. 5. As the name implies, this class of code is designed such that the last '1' in each row of H are placed along a linear diagonal of the matrix. The remaining bits are placed randomly to the left of the diagonal with a one-sided Gaussian distribution. The GDLD code is defined by three design parameters—row_weight, $\sigma$ and offset. The row_weight is the number of '1's in each row of the matrix while $\sigma$ defines the standard deviation of the Gaussian distribution. The offset parameter indicates the horizontal offset of the linear diagonal relative to the top left corner of the code's parity check matrix.

The placement of the last '1' along the linear diagonal in every row of a GDLD code ensures that parity checks occur at more regular intervals throughout the JVDD trellis. The growth in the number of survivor paths can thus be curbed, resulting in a reduced computational complexity of the JVDD.

The second subclass of codes that may be provided according to various embodiments, the GDPD code, shares a similar concept. It differs from GDLD codes in that its diagonal takes on the shape of a parabola as depicted in the bottom part of FIG. 5. GDPD codes are also defined by three design parameters—row_weight, $\sigma$ and $\dot{y}$. Here, the row_weight and $\sigma$ share the same definition as that for GDLD codes. The third parameter, $\dot{y}$, represents the derivative of the parabola at the bottom right corner of the matrix. Similar to the GDLD, this class of code enables parity checking to be done in a more regular manner throughout the JVDD trellis.

The relative performance of these two classes of codes and their effectiveness in lowering the computational complexity of the JVDD are described in more detail below.

Another feature that controls/limits the number of survivors in the JVDD trellis is the operating SNR. At low SNR, due to the noise, many survivors may make it within the threshold of the minimum metric survivor for each node. This may mean that the number of survivors will grow more quickly at low SNRs. Conversely, at higher SNRs, the probability of competing survivors making it inside the threshold of the minimum metric survivor becomes less, and the JVDD complexity will be lower. It is to be noted that the JVDD and the competing iterative detector should operate at comparatively high SNRs at which the frame error rate is acceptably low. This may favor the computational complexity for the JVDD.

The longer the CWL (code word length), the longer the trellis, and the more opportunity there is for the MMLC to be ousted from the survivor list by competing survivors. Thus longer CWLs tend to require larger threshold and/or maxNoSurv parameters leading to higher complexity. Conversely at shorter CWLs, the JVDD tends to outperform the iterative detector by substantial margins at reasonable complexity as will be seen in the simulation results described below. Applications requiring longer CWLs require extra effort to make the JVDD tractable while for shorter CWLs, the JVDD performs close to optimal at reasonable thresholds and complexities for the given code.

In the following, lower rate codes according to various embodiments will be described.

One way to mitigate the computational complexity of the JVDD is to use codes with lower rates in conjunction with the abovementioned JVDD codes. This may reduce the complexity because codes with lower rates have a greater number of parity checks per channel bit leading to more frequent survivor killing in the JVDD trellis than when using higher rate codes.

In the following, simulations and results according to various embodiments will be described.

As will be described in more detail below, results for the following sets of simulations will be provided. Firstly, the effects of varying the threshold and maxNoSurv parameters will be described. Subsequently the effects of varying CWL and code rate will be described. Results for both random LDPC and JVDD codes will be shown, and a comparison of the performance of the JVDD with the iterative BCJR/SPA detector will be given. For the random LDPC code, the column weight may be 3, and the 4 cycles are removed from the code. For the JVDD code tested here, the row weight is 50, $\sigma=100$ and the offset parameter is equal to 70. The results described here use the implementation of the JVDD that increases the threshold and goes back to the beginning in the event that no survivor makes it through the trellis.

In the following, results for varying thresholds will be described. In this simulation set the CWL is held fixed at CWL=256 and the maxNoSurv parameter is not used in the JVDD. Simulations are run for both the iterative detector and the JVDD algorithm using both a random code and a JVDD GDLD code, both with a code rate of R=0.95. The threshold is varied from 0.5 to 2 in steps of 0.5. The results are shown in FIG. 6.

Figure 6:
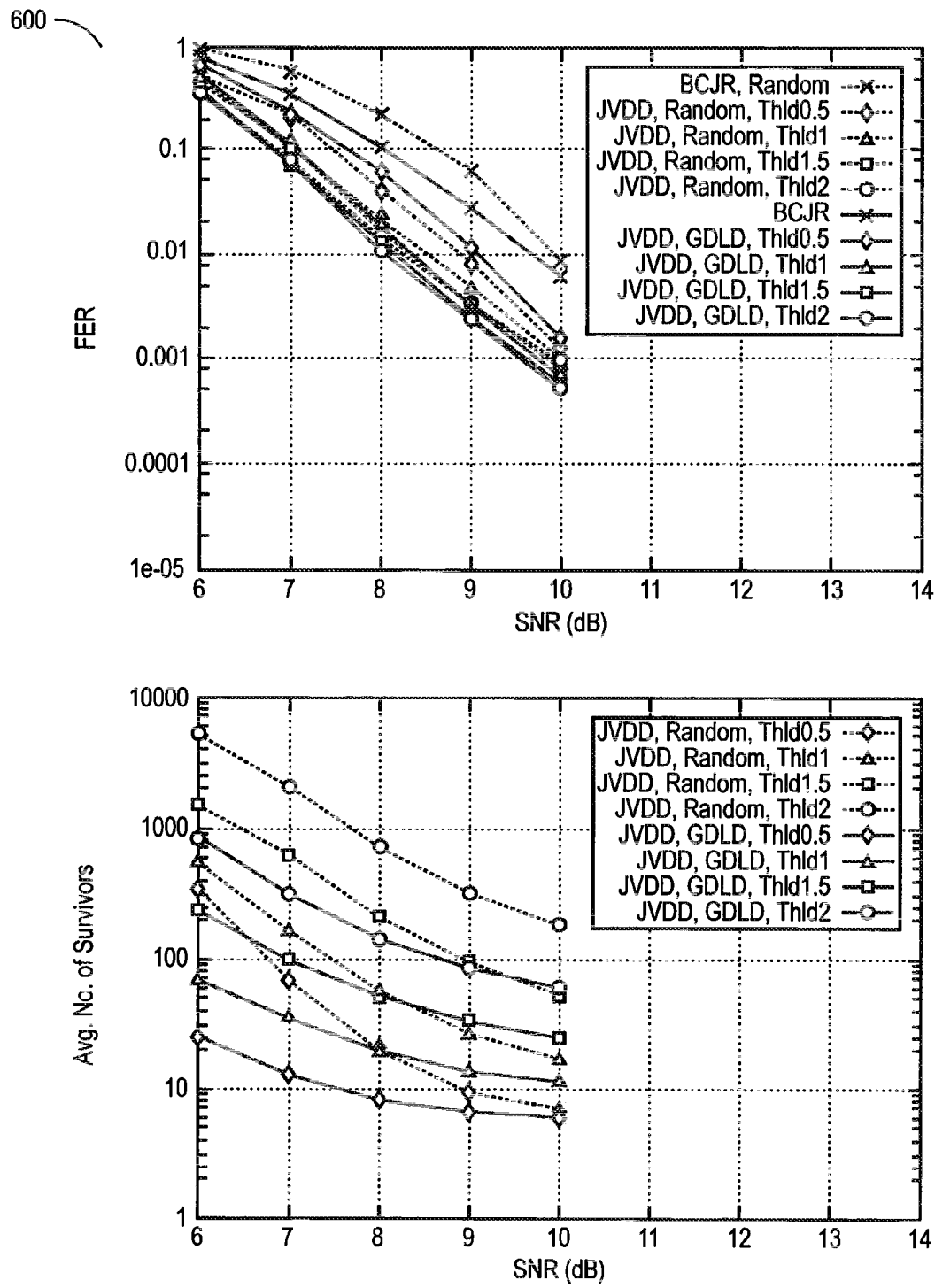
FIG. 6 shows illustrations of simulation results according to various embodiments.

FIG. 6 shows an illustration 600 of iterative detector results and JVDD results varying the threshold parameter. Solid curves correspond to the JVDD code while dotted curves corresponds to the random LDPC code. Code rate is R=0:95 in both cases. The left figure shows the FER performance while the right figure is the average number of survivors. CWL=256.

The performance of the iterative BCJR/SPA detector with 6 iterations is also shown for reference. FIG. 6 shows that as threshold increases, performance improves, but complexity (in terms of the average number of survivors per bit) increases. Both random LDPC code (dotted line) and JVDD code (solid line) are shown in this figure and it is observed that the JVDD code sometimes does better, sometimes does worse in terms of performance, but the complexity is much lower, although at higher SNR's the difference between the JVDD and random codes is less. As described above, the complexity decreases as SNR increases, as fewer paths make it inside the threshold at higher SNRs. It can be seen that the JVDD is outperforming the iterative BCJR/SPA by 1-2 dB depending on value of threshold, both for JVDD and random LDPC codes. It's also noted that the performance improvement for the JVDD saturates with increasing threshold indicating that the performance could be approaching optimality for this particular code.

In the following, results for varying maxNoSurv will be described.

Figure 7:
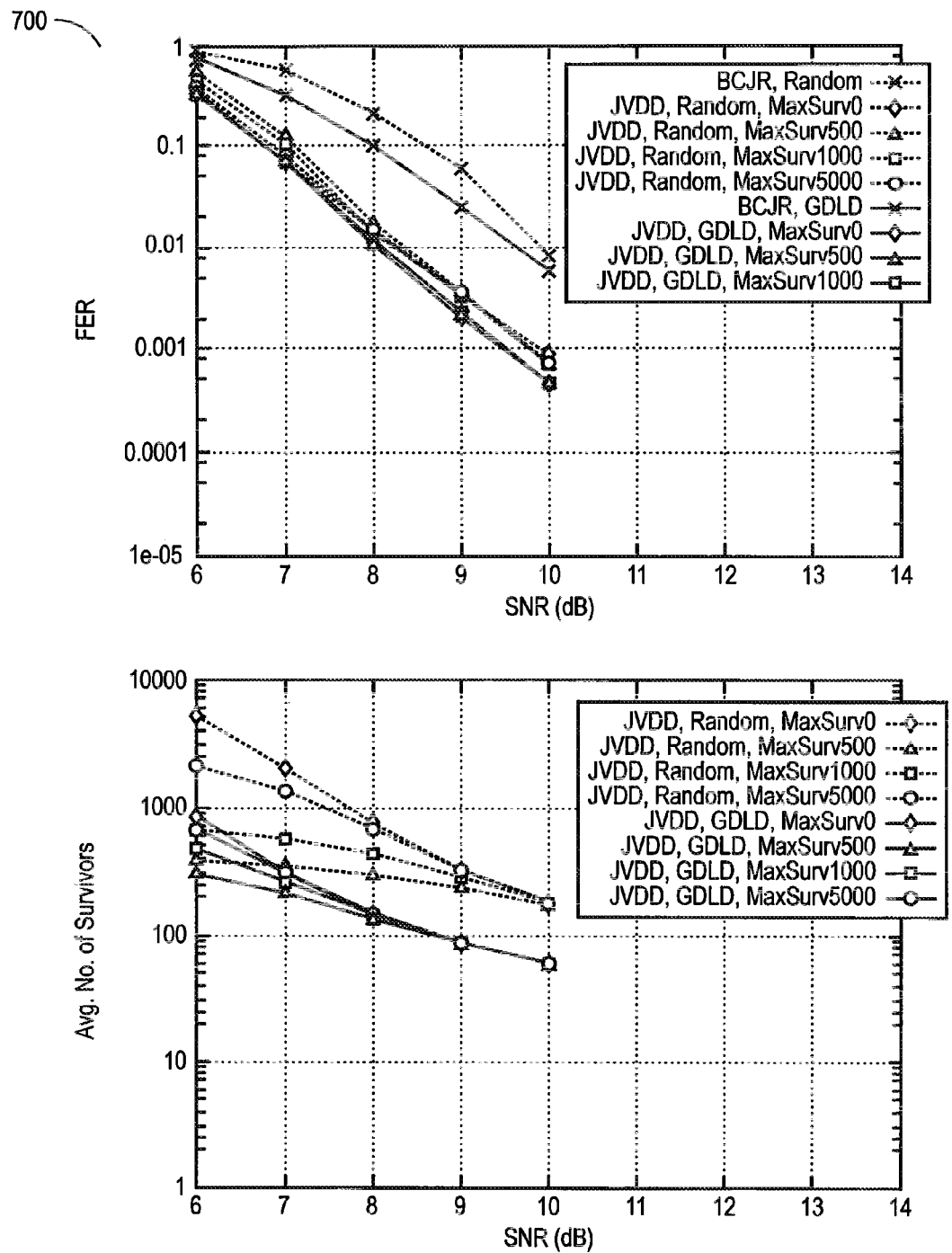
FIG. 7 shows illustrations of simulation results according to various embodiments.

FIG. 7 shows an illustration 700 of iterative detector results and JVDD results varying the threshold parameter. Solid curves correspond to the JVDD code while dotted curves corresponds to the random LDPC code. Code rate is R=0:95 in both cases. The left figure shows the FER performance while the right figure is the average number of survivors. CWL=256.

In FIG. 7, the effect of the maxNoSurv parameter is investigated at a constant threshold=2. The CWL is again fixed at 256 and simulations are again run for both random LDPC and JVDD codes. maxNoSurv=0 is equivalent to turning it off. In this particular set of simulations, there is not a large performance difference between maxNoSurv=500 and maxNoSurv=5000. This may be attributed to the fact that the CWL is relatively short and a large number of survivors is not as needed in the JVDD when the CWL is short. The complexity plot on the right is again showing a decreasing complexity for increasing SNRs for all codes and significantly reduced complexity of the JVDD codes over the random LDPC codes. It is to be mentioned that these complexity plots apply only to the JVDD, as the iterative detector's complexity does not depend on the number of survivors in its trellis, but is much more complicated to evaluate. Also, although the maxNoSurv parameter is not so critical at these CWL's, it is an important parameter at longer CWLs when the number of survivors easily becomes unmanageable.

In the following, results for varying code rate and CWL will be described.

Figure 8:
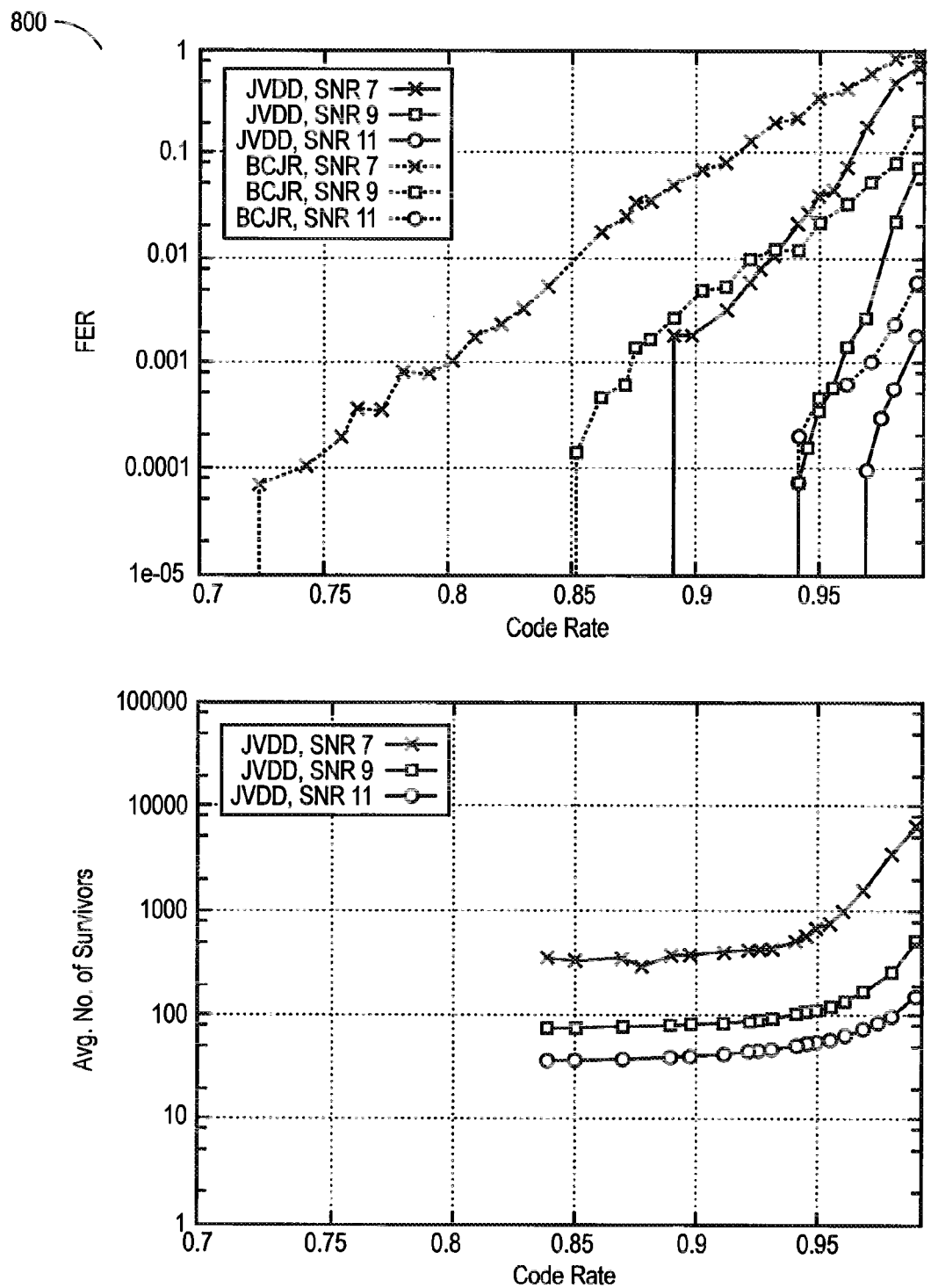
FIG. 8 shows illustrations of simulation results according to various embodiments.
Figure 8:
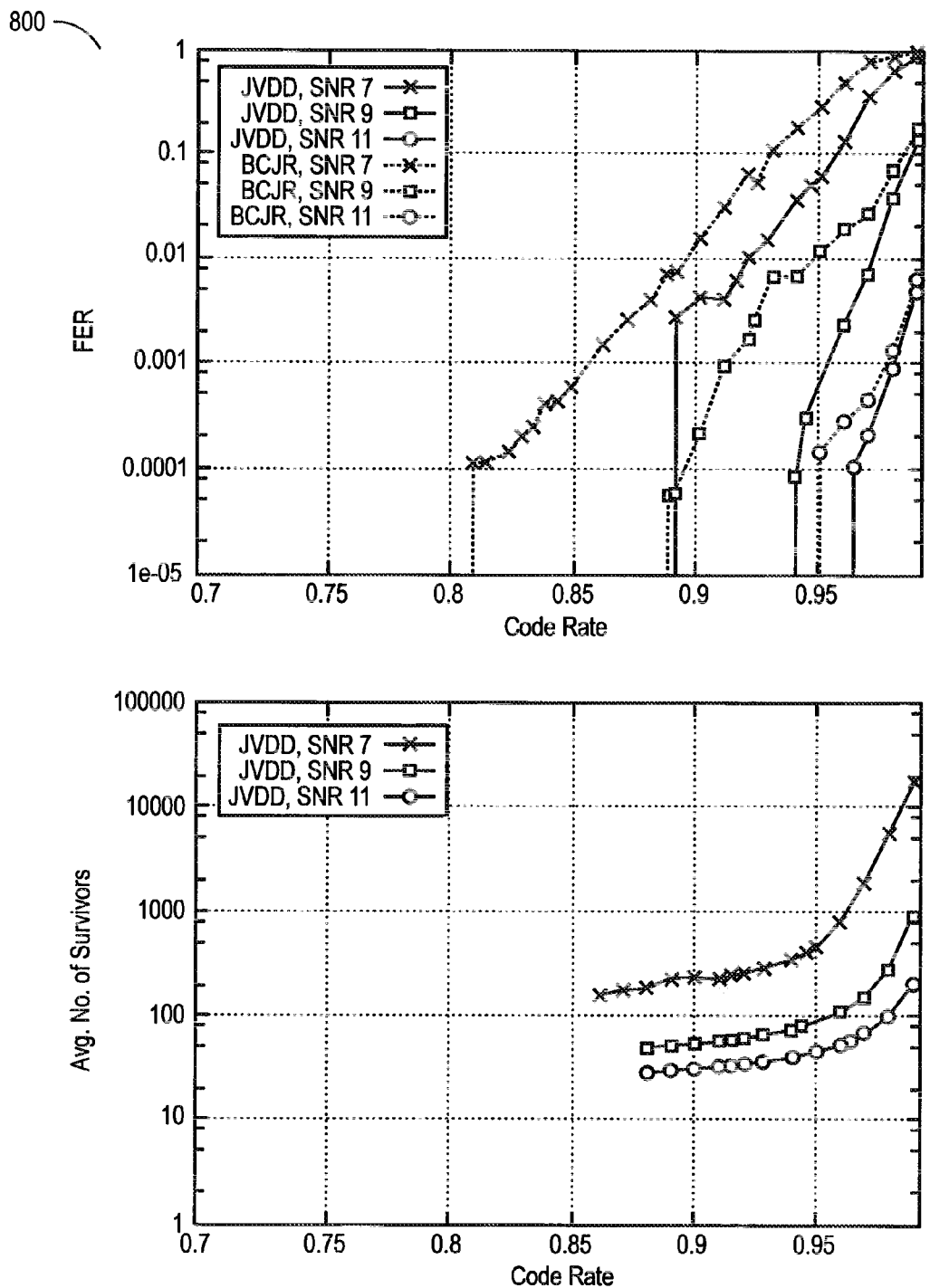

FIG. 8 shows an illustration 800 of results of the JVDD and BCJR detectors varying the code rate R. Top plots are for CWL=512, bottom plots are for CWL=1024. Left plots show performance as a function of code rate for both the JVDD (solid curve) and iterative (dotted curve) while the right plots show the average number of survivors of the JVDD for different SNRs.

In this experiment set, the effect of varying the code rate and the CWL of both the iterative detector and the JVDD is shown. FIG. 8 shows the results with the top two plots corresponding to CWL=512, while the bottom two are for CWL=1024. As the computational complexity becomes unmanageable for random LDPC codes at these longer CWLs, only the results for JVDD codes can be shown here.

The increase in the average number of survivors (complexity) for the JVDD at CWL=1024 over CWL=512 at high code rates can be seen, but it drops more quickly as the code rate decreases. This is a pleasantly surprising result as it may mean that the JVDD could be computationally feasible at longer CWL's by reducing the code rate. It is to be noted that the complexity drops with reducing code rate, but the rate at which it drops seems to slow down after a certain point. The performance plots again show the JVDD (solid curves) outperforming iterative detector (dotted curves) in all circumstances tested. However it is noted that the margin by which it outperforms the iterative detector decreases with increasing CWL. This is attributed to two factors: firstly, the iterative detector becomes more efficient as the CWL gets longer. This is the main reason that the HDD industry is transitioning from sector sizes of 4 k to 32 k bits. Secondly at longer CWLs, the JVDD becomes more computationally complex necessitating more restrictive threshold and maxNoSurv parameters to make it computationally feasible. Not only is this necessary from the standpoint of hardware implementation of these algorithms, it is also necessary for us to generate our results in a reasonable time and with reasonable memory consumption of our simulations. Without restricting the number of survivors, the JVDD can consume all the memory on our computing servers as the CWL grows.

As has been observed in the previous simulation sets, it may be observed in FIG. 8 that the computational complexity of the JVDD drops increasing with SNR.

Figure 9:
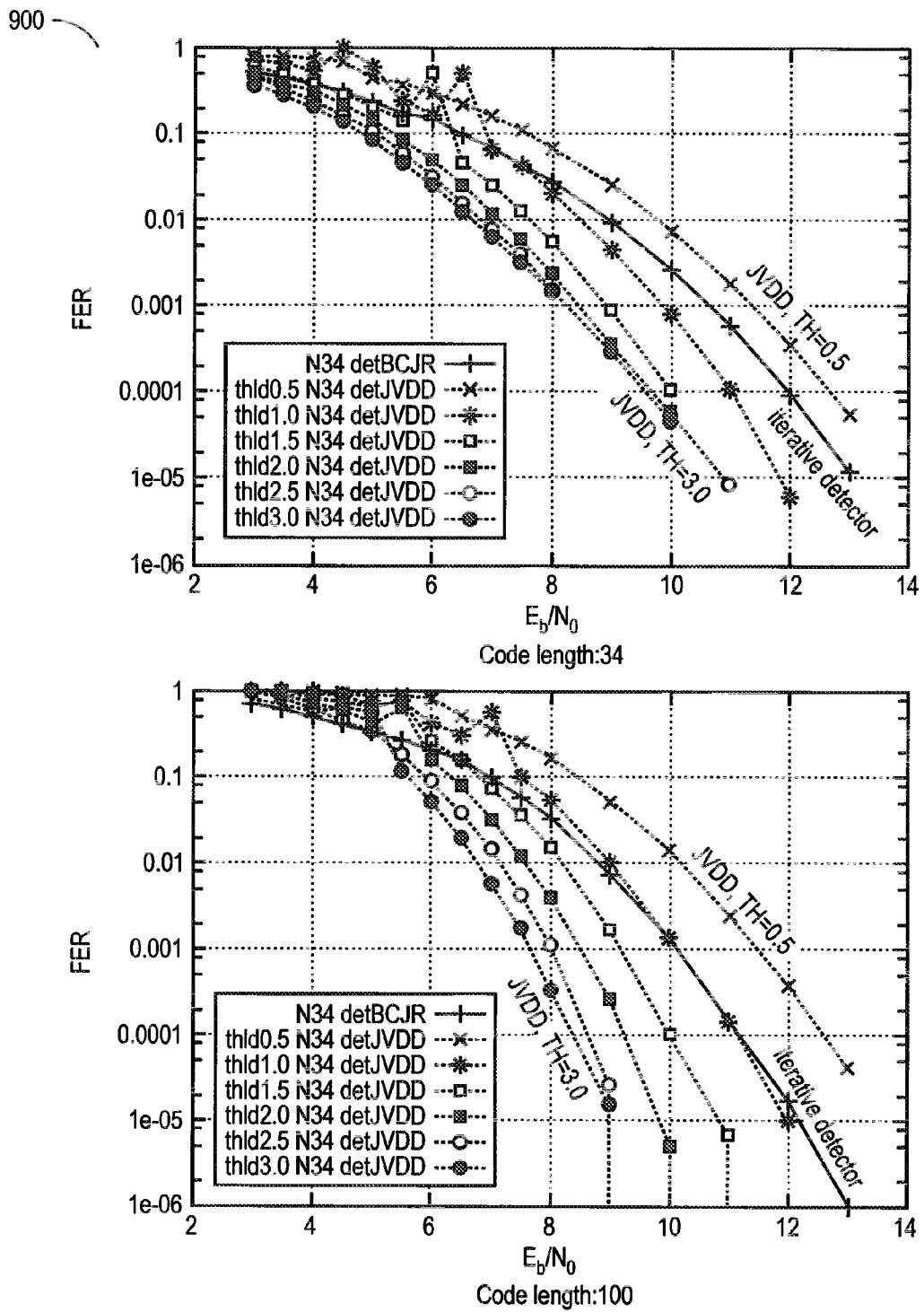
FIG. 9 shows illustrations of simulation results according to various embodiments.

FIG. 9 shows an illustration 900 of JVDD simulation results. JVDD may be written in Perl integrated into the SWRC platform. Simulations for short ideal ISI/AWGN Channel, short codeword length and code rate=0.7 may be provided. According to various embodiments, more than 2 dB gain of JVDD over iterative detector may be provided. Gain increases with CWL (which may be unexpected). JVDD may have a steeper slope than iterative detector. Improvement with threshold according to various embodiments may approach optimum.

Simulations and simulation experiments to study the performance and complexity of the JVDD when using the GDLD, GDPD and random codes were performed. For each simulation set, the performance of the JVDD with the various codes is compared with that of the conventional iterative detector/decoder using the BCJR and SPA algorithms. The simulations were conducted over a coded ISI/AWGN channel. The parameters used in the simulations are documented in Table 1.

TABLE 1

| channel | SNR | 6, 7, 8, 9, 10 |
|---|---|---|
| | $h_k$ | 0.408248, 0.816497, 0.408248 |
| codes | R | 0.82, 0.86, 0.90, 0.94, 0.98 |
| | CWL | 256, 512 |
| | type | Random, GDLD, GDPD |
| BCJR-SPA | localIter | 150 |
| | globalIter | 6 |
| JVDD | threshold | 2 |
| | maxNoSurv | 1000, 10000 |

The properties of the codes tested are as shown in Table 2.

TABLE 2

| random codes | col_weight | 3, 4, 5 |
|---|---|---|
| GDLD codes | row_weight | 50, 100, 150 |
| | σ | 50, 100, 150 |
| | offset | 40, 70, 100, 130, 160 |
| GDPD codes | row_weight | 50, 100, 150 |
| | σ | 50, 100, 150 |
| | ẏ | 0, −0.5, −1, −1.5, −2 |

In the following, simulation results will be described. Simulations were first carried out to evaluate the overall performance of the three classes of codes when used with both detection schemes at CWL=256 and R=0.9 and with threshold=2 and maxNoSurv=1000. Following that, one of the best GDLD and GDPD codes were identified and a study on the performance as a function of each individual design parameters of the codes was carried out.

In the following, performance of JVDD and iterative detector/decoder when used with different class of codes will be described.

Figure 10:
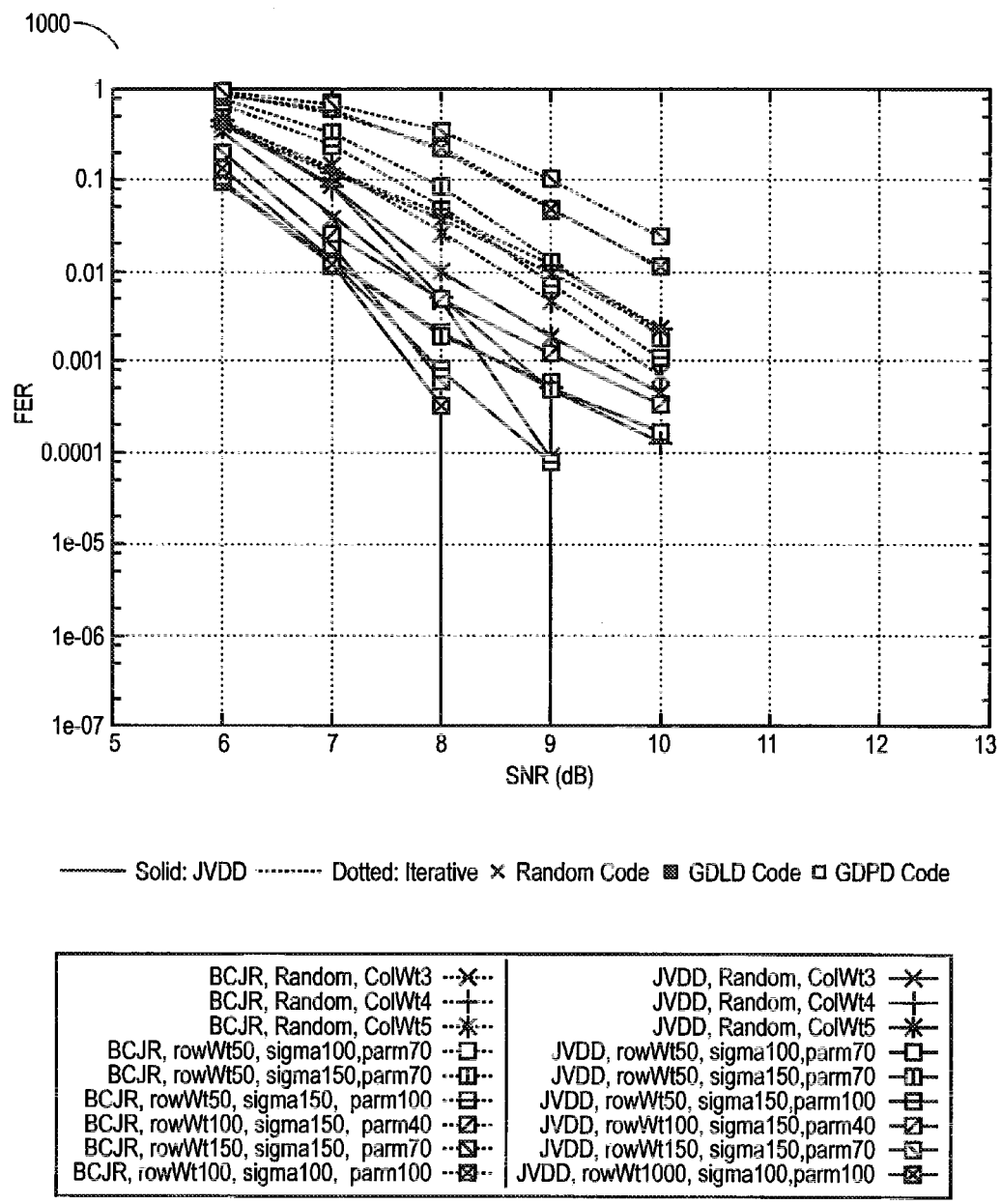
FIG. 10 shows illustrations of simulation results according to various embodiments.
Figure 10:
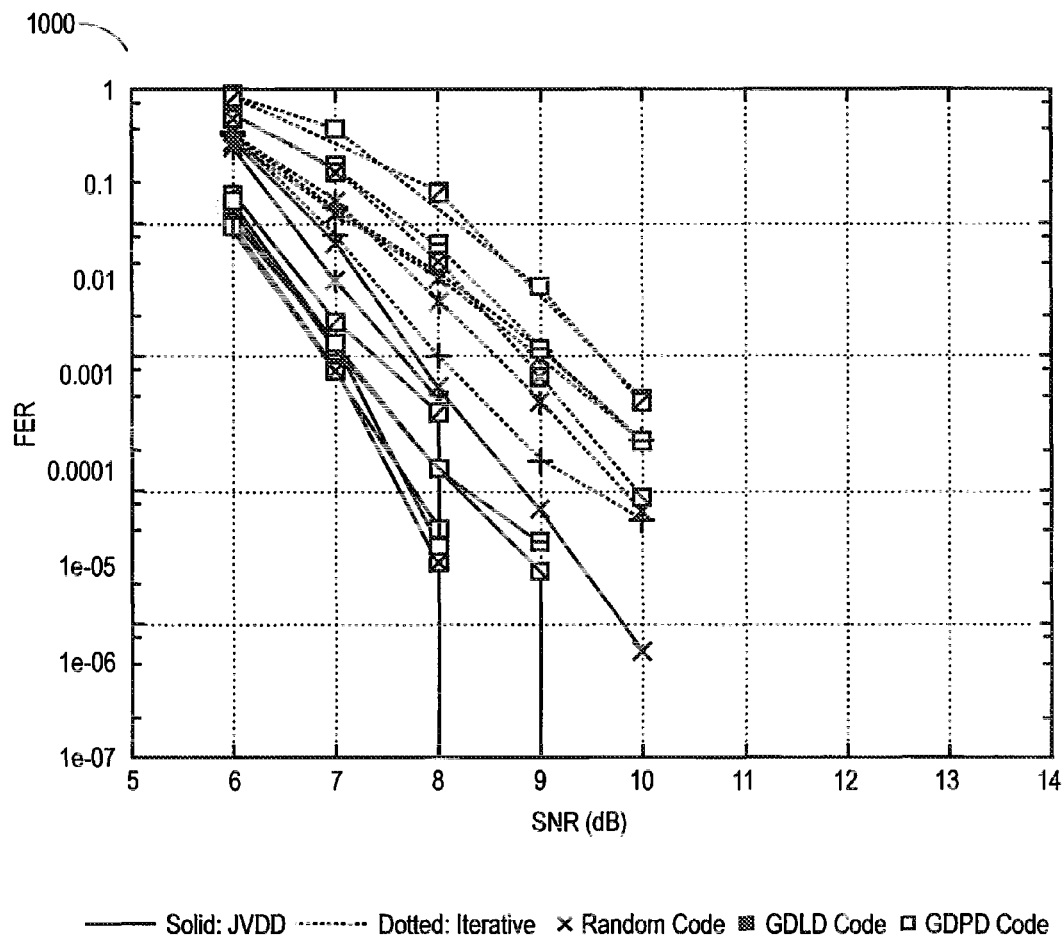

FIG. 10 shows an illustration 1000 of a performance comparison for random/GDLD codes (left) and for random/GDPD codes (right) at CWL=256 and R=0.9. The figure also compares the JVDD and iterative detector/decoder. Here, threshold and maxNoSurv are set to 2 and 1000 respectively.

FIG. 10 shows the performance curves for both detector/decoders when used with random/GDLD codes on the left and random/GDPD codes on the right. The random LDPC codes are used as the benchmark in both cases. In this figure, the different line styles (solid and dotted) represent the curves for JVDD and iterative detector respectively, while different markers represent the different classes of codes and the colors are used to differentiate between codes in the same class with different parameters. The same color is used to represent the same code between the two types of detectors/decoders. The study may be started by plotting all the results in FIG. 10 to observe the trends and to identify the good/best performing curves for further dissection.

In FIG. 10, the JVDD outperforms the iterative system for random, GDLD and GDPD codes, attaining a largest performance difference of more than 2 dB. Looking at the curves on both plots, in general the JVDD codes tend to outperform the random codes when used with the JVDD, while random codes tend to perform better with the iterative detector. As described above, the last '1' in each column of H are more evenly distributed in JVDD codes as oppose to that in random codes. This helps to enhance the complexity/performance of JVDD. Conversely, for the iterative system, random codes are seen to have better performance than the JVDD codes. This is due to the presence of relatively larger number of short cycles in JVDD codes than in random codes, leading to a greater performance degradation in the SPA decoder of the iterative system. Looking at the curves for random codes (× markers), increasing values of col_weight gives better performance for both detection schemes. The trends of the JVDD codes are not clear as they are dependent on the variation of 3 parameters. As such, in the following, a study on the variation of each parameter individually will be described.

From the mass plot in FIG. 10, one of the best GDLD and GDPD codes may be identified for a more in-depth dissection. For the GDLD, parameters row_weight=50, σ=150 and offset=100 may be chosen, and for the GDPD, parameters row_weight=100, σ=100 and ẏ=−1.5 may be chosen. Starting from these 2 curves, each of the 3 design parameters (row_weight, σ and offset for the GDLD code and row_weight, σ and ẏ for the GDPD code) may be changed, and the effect and sensitivity of the performance to each parameter will be described.

In the following, effects of GDLD and GDPD code design parameters will be described.

Figure 11:
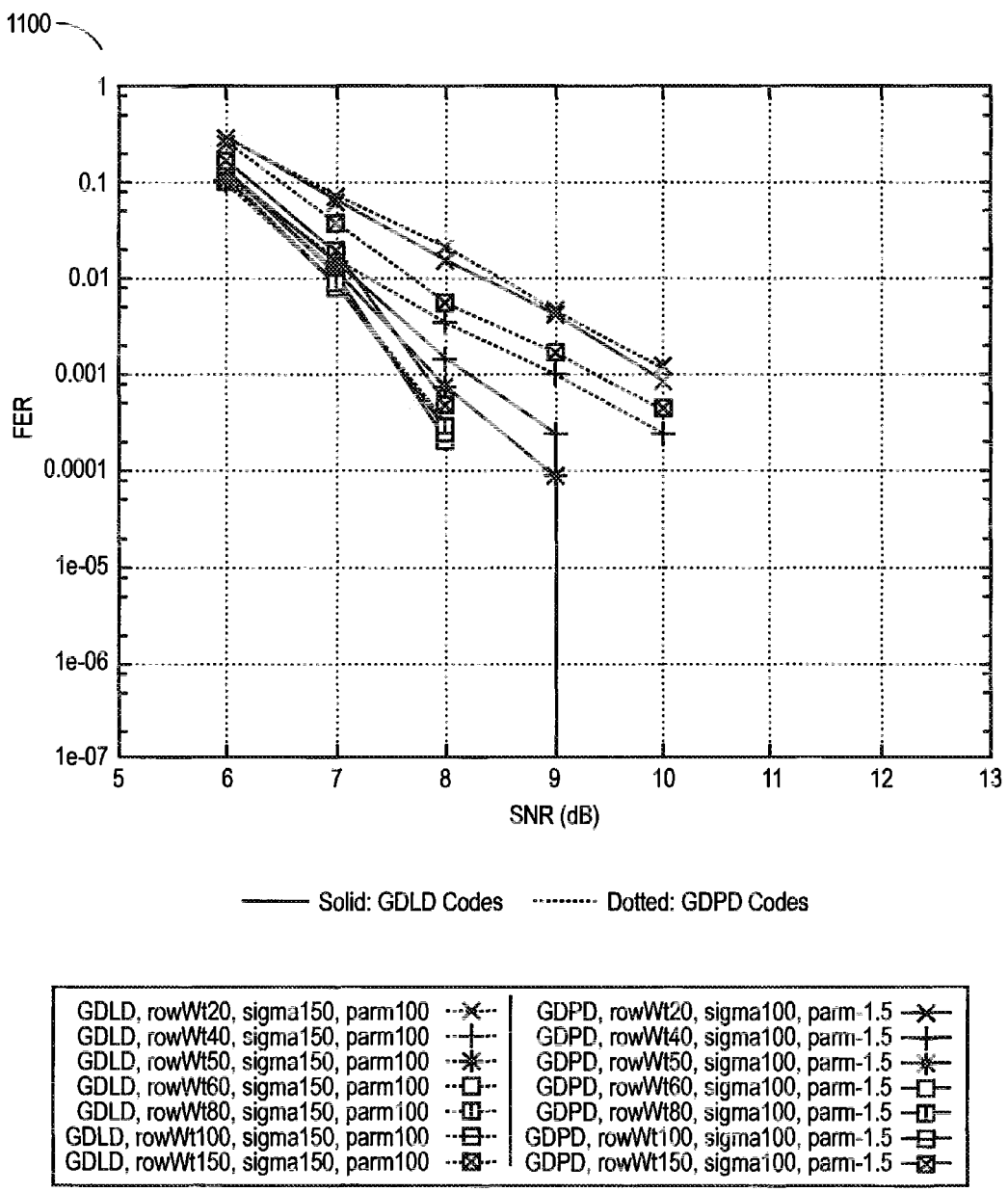
FIG. 11 shows illustrations of simulation results according to various embodiments.
Figure 11:
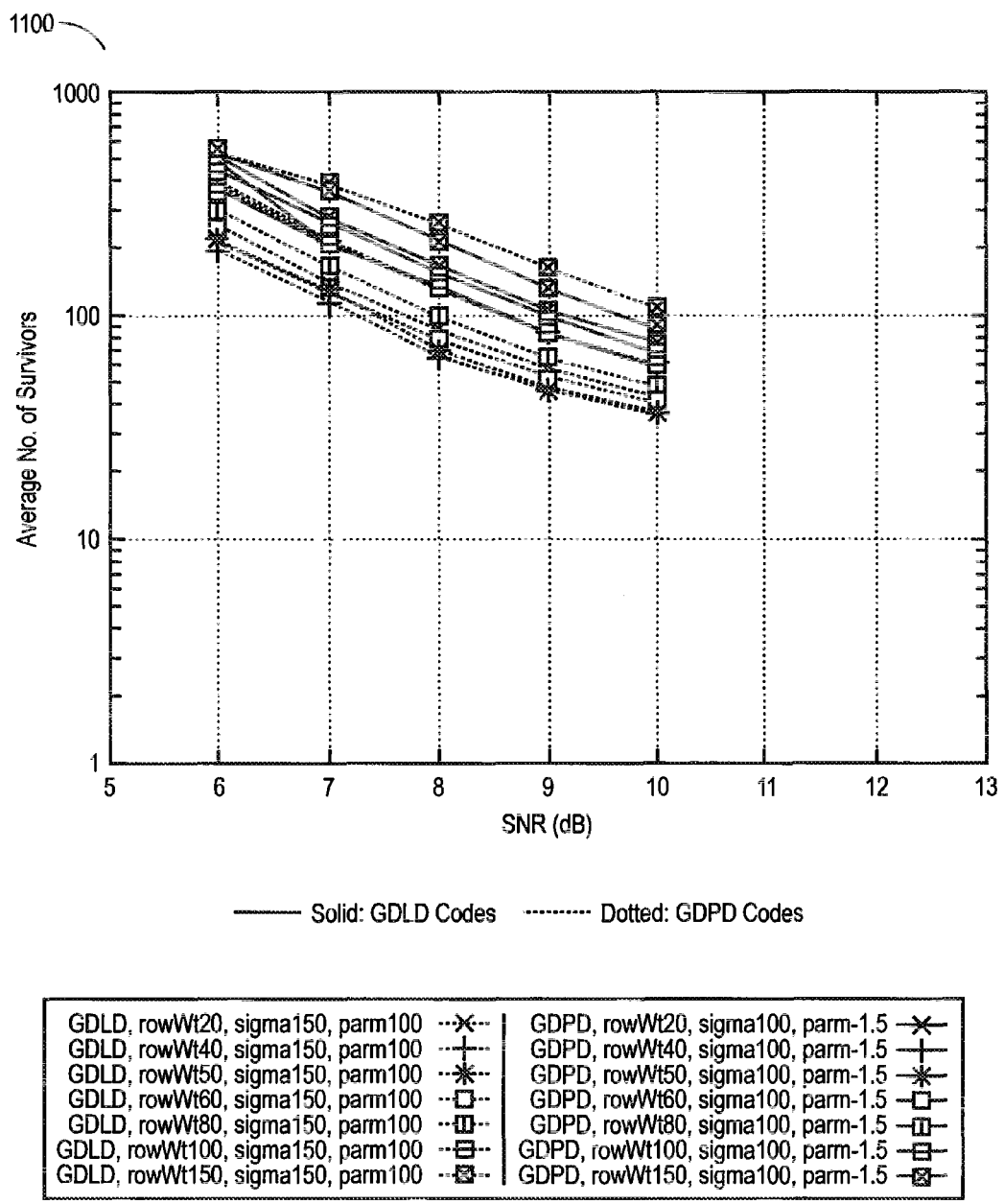
Figure 11:
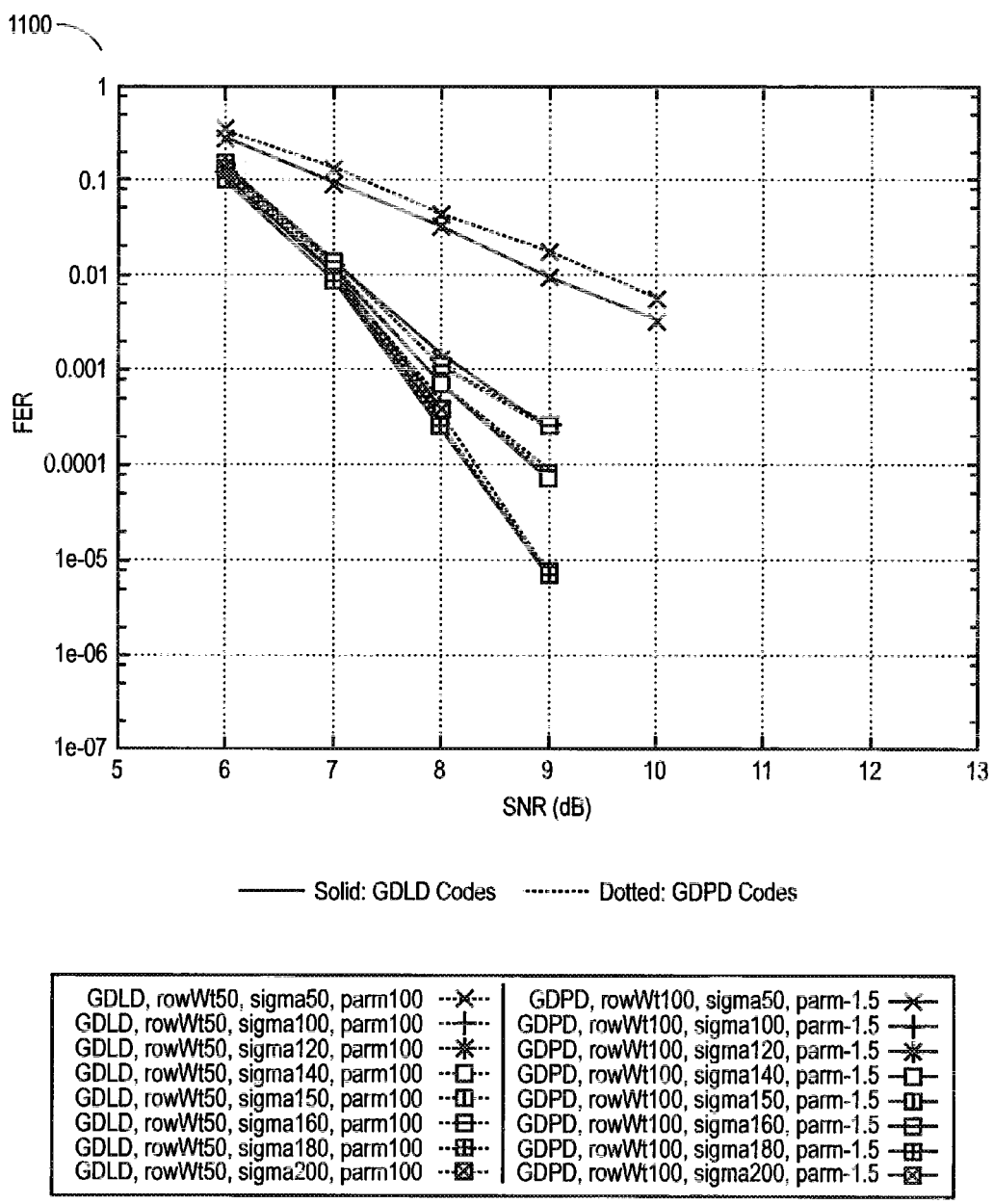
Figure 11:
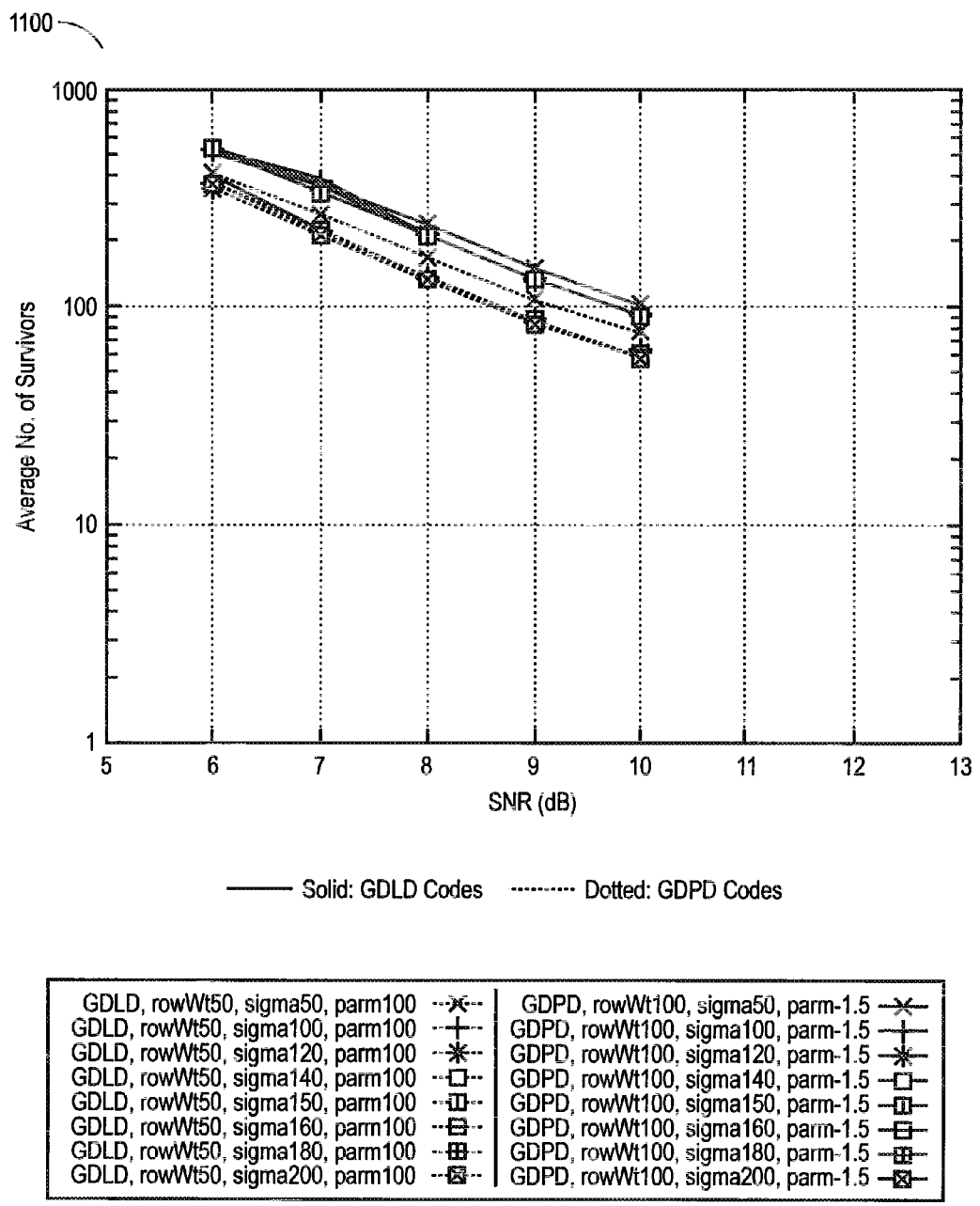
Figure 11:
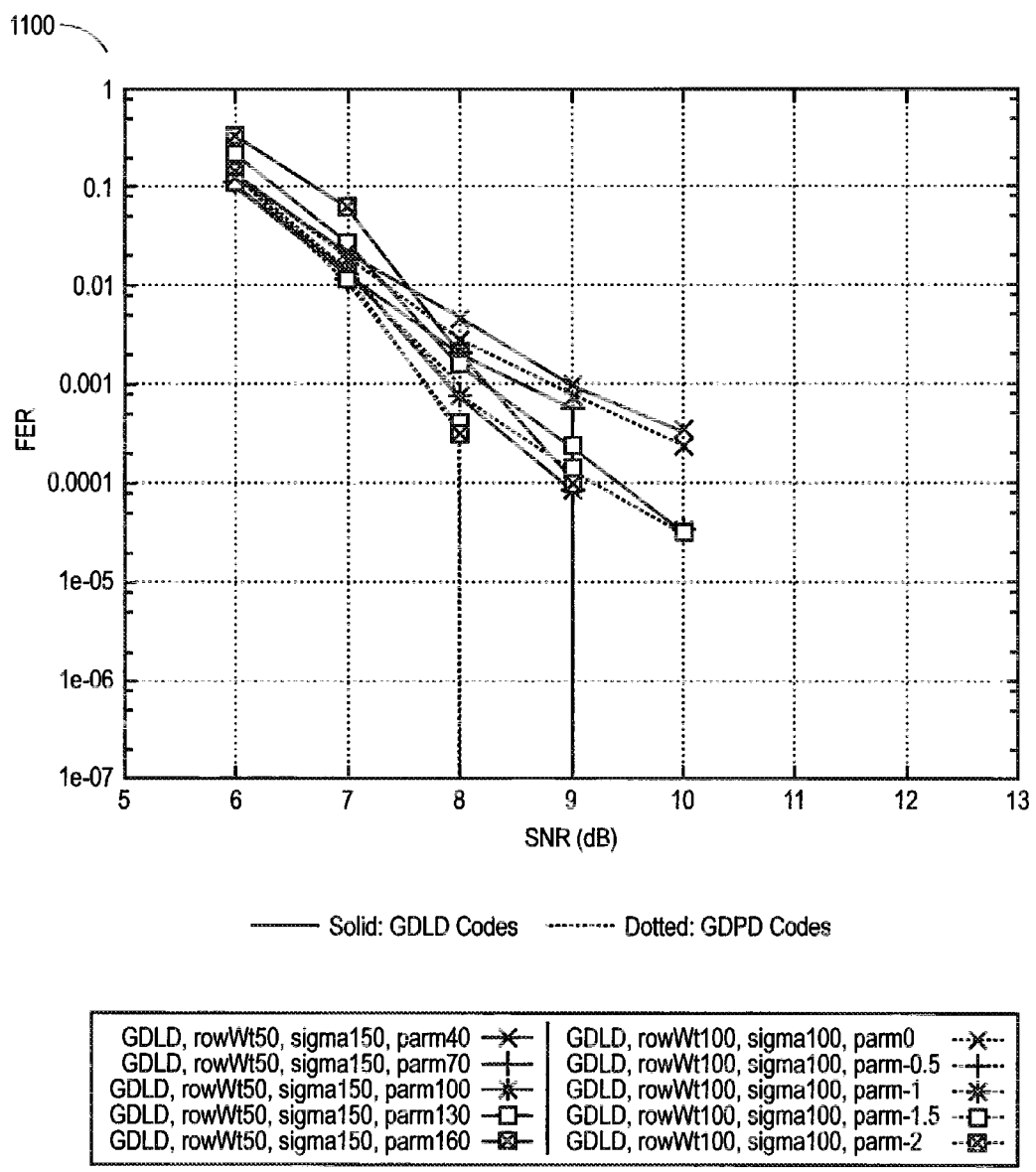
Figure 11:
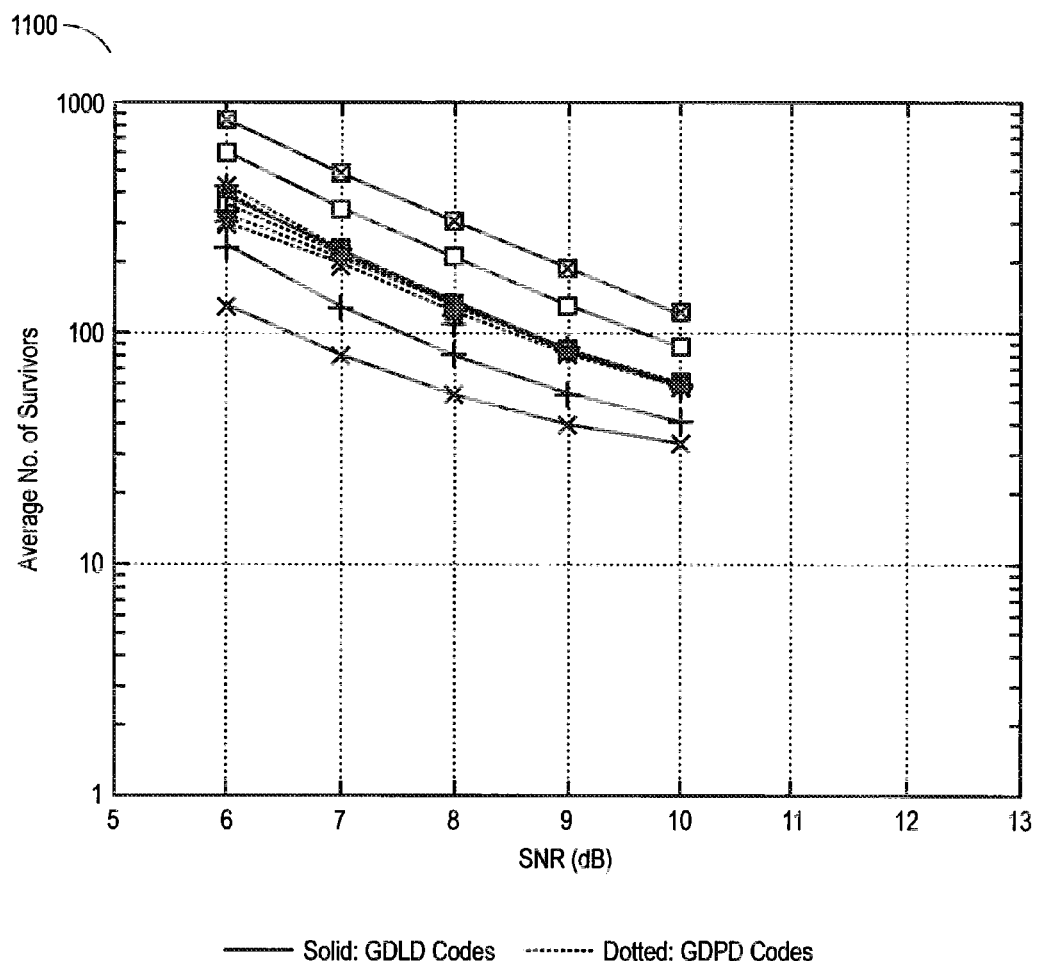

FIG. 11 shows an illustration 1100 of effects of the various parameters of GDLD and GDPD on performance and computational complexity of JVDD. The top 3 plots show the performance of GDPD and GDLD codes varying each of their key design parameters, while the bottom 3 plots show the complexity in terms of the average number of survivors. The left, middle and right plots represent the effect of varying row_weight, σ and, the third design parameter (offset for GDLD and ẏ for GDPD) respectively.

FIG. 11 shows the effects of the listed parameters of GDLD and GDPD on performance and computational complexity of the JVDD. Additional σ and row_weight points are included here for a more thorough analysis. Only the results of the JVDD may be plotted omitting the iterative detector and varying just a single JVDD code parameter in each case.

Both GDLD and GDPD codes may be plotted on the same figure with performance curves shown above and complexity curves below. The computational complexity is quantified in terms of the average number of survivors in the JVDD trellis. The effect of variation of row_weight on the GDLD and GDPD codes is shown in the leftmost column of FIG. 11. It can be seen in this figure that the performance of JVDD improves as row_weight increases for both GDPD and GDLD codes, up to an optimal row_weight of 100 for GDLD and 80 for GDPD. Beyond this point, further increase in row_weight leads to a deterioration in performance. The corresponding complexity plots for both codes indicate that smaller row_weights are in general less complex (with an exception for row_weight=20).

The middle column plots in FIG. 11 show the effect of varying σ on the performance and complexity of the GDLD/GDPD codes. Both GDLD and GDPD show an improvement with increasing σ, up to σ=180. Beyond this σ value, the performance of the detector degrades slightly. The σ variation only has a small effect on the JVDD's complexity, especially for the GDLD codes. There is a slightly greater dependency on σ for the GDPD codes with reduced complexity as σ increases. It is to be notes that it makes sense that performance should increase with increasing σ. Referring back to FIG. 5, it can be seen that smaller σ leads to the '1's clumped more closely the diagonal, while larger σ leads to more spread-out '1's in each row. When the '1's in each row are tightly clumped, checking of bits only occurs in a very limited range of the codeword. This means that each channel bit is only checked with bits nearby, and not with bits further away for small σs. This is almost equivalent to having the longer codeword broken up into a sequence of shorter codewords and in general, shorter codewords don't perform as well.

In the rightmost portion of FIG. 11, the performance and complexity for variations in the third parameter which is the offset parameter in the case of GDLD codes and the ẏ parameter for GDPD codes is plotted. Increasing the GDLD offset parameter enhances the performance until an optimum point is reached, after which further increase reduces the performance. Meanwhile, the trend of increasing complexity with increasing offset is evident here. This trend is attributed to the fact that as offset gets larger, the 'parity checks' section gets shifted later in the JVDD trellis. The number of survivors thus has more opportunity to grow before the 'parity checks' section begins, leading to higher average number of survivors. This, however, causes the average number of survivors to exceed the maxNoSurv limit of 1000. Survivor paths are thrown away as a result, causing the MMLC to be discarded with a higher likelihood and hence a deterioration in performance. For the GDPD parameter ẏ, the performance shows a clear trend of improving with increasing ẏ value. The complexity plots, however, appears to be pretty insensitive to this parameter.

In the following, effects of varying code rate, R, will be described. The code rate, R, of each of the three types of codes may be varied, and the performance of JVDD and the iterative detector/decoder may be evaluated.

Figure 12:
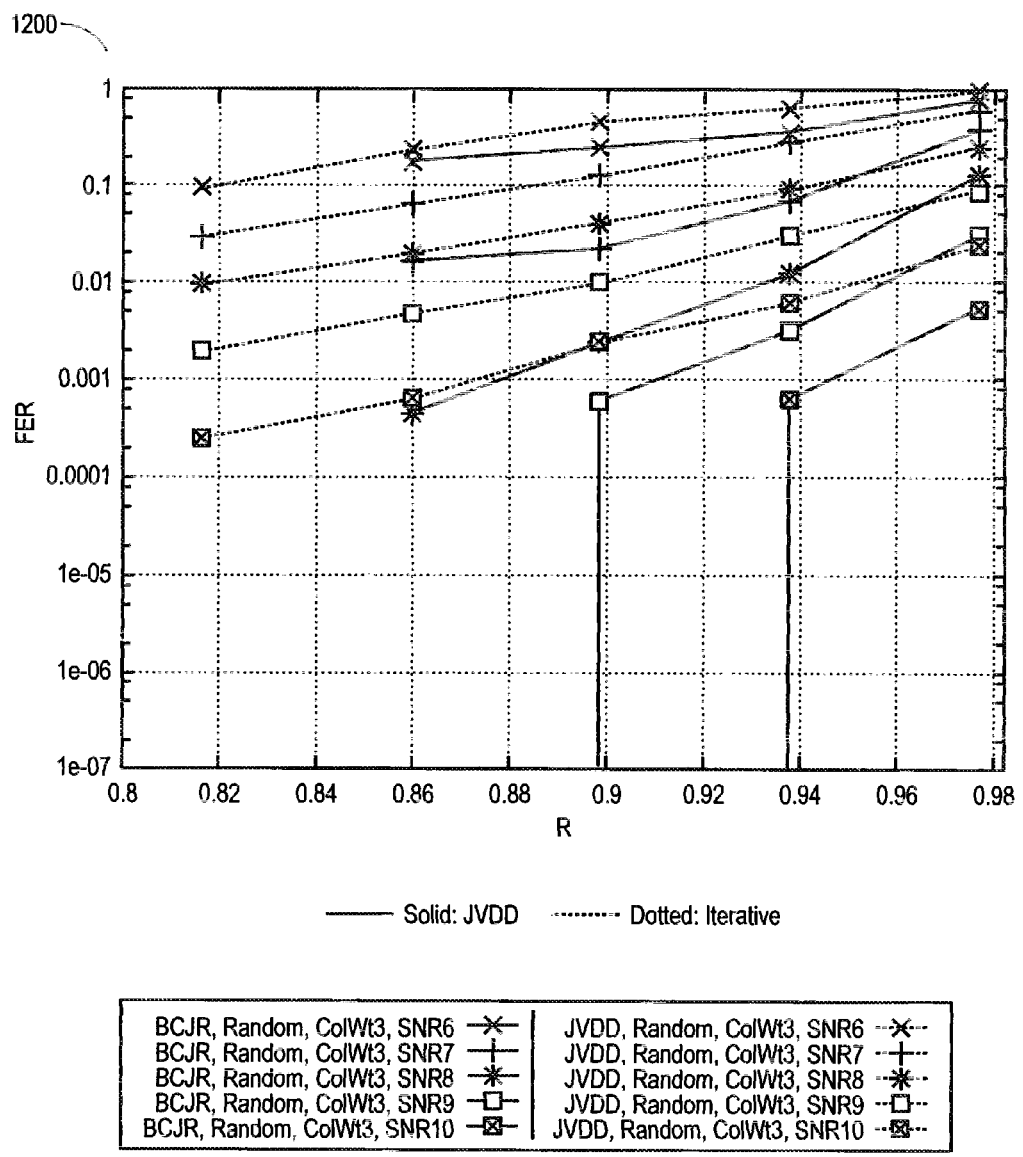
FIG. 12 shows illustrations of simulation results according to various embodiments.
Figure 12:
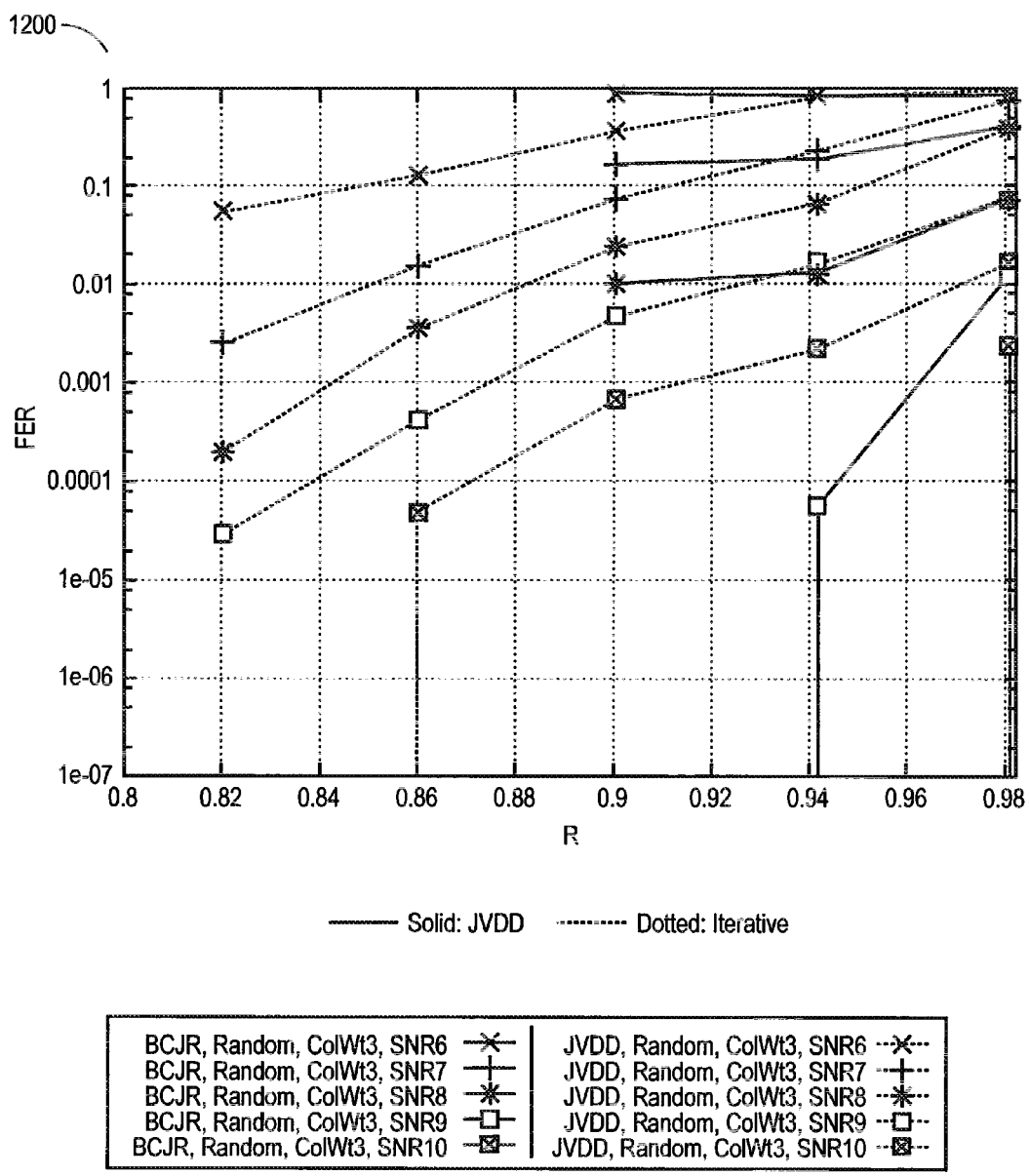
Figure 12:
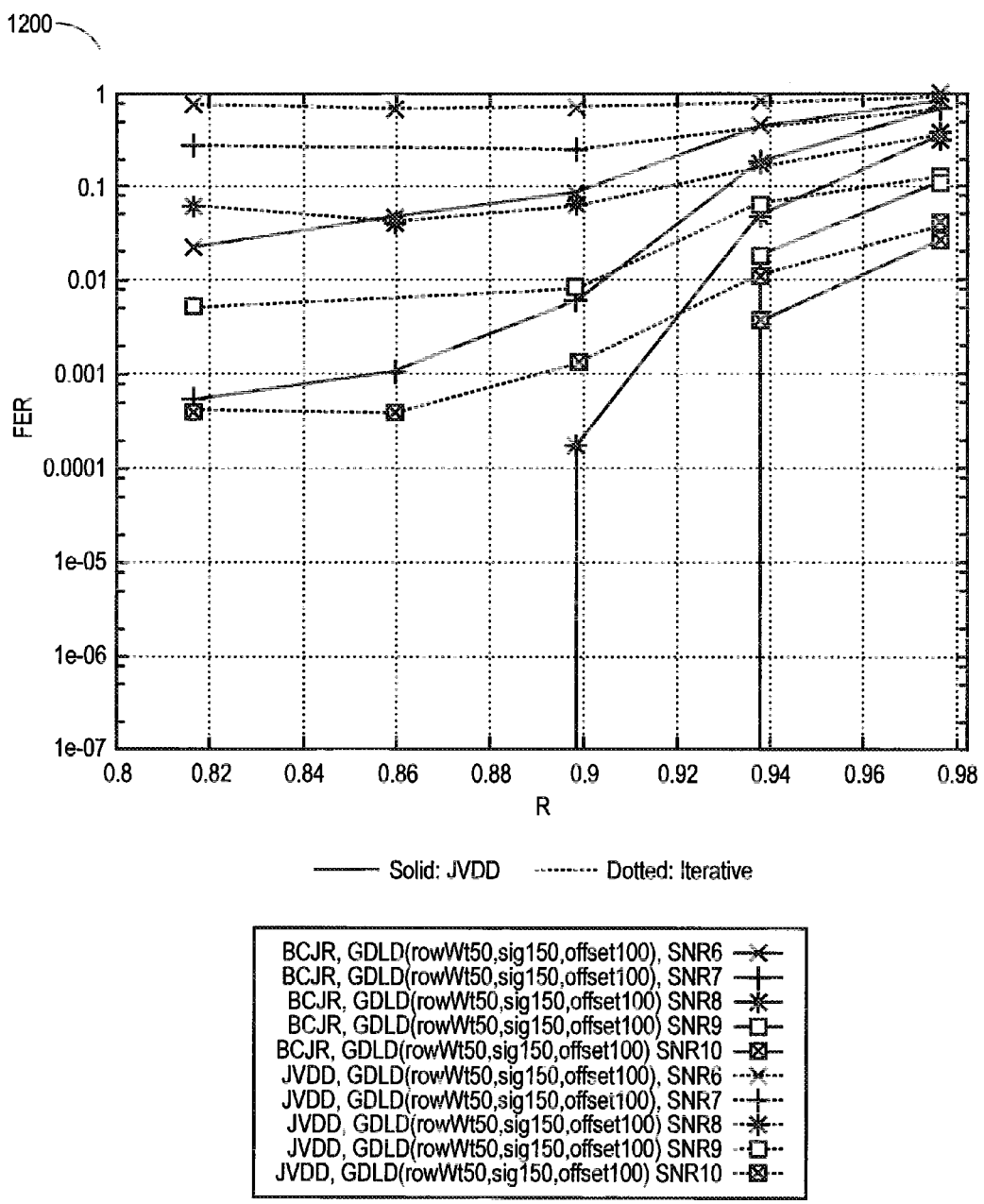
Figure 12:
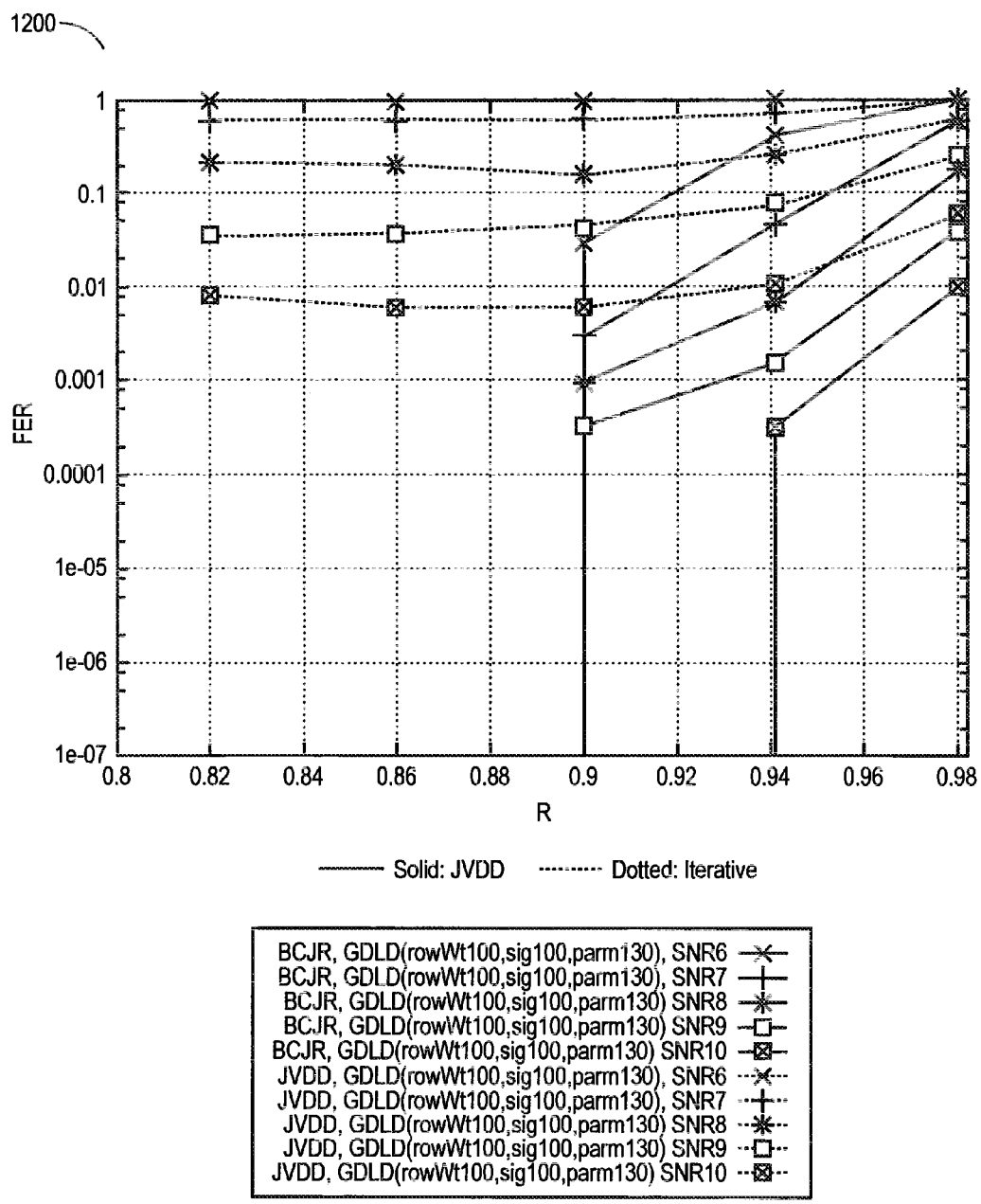
Figure 12:
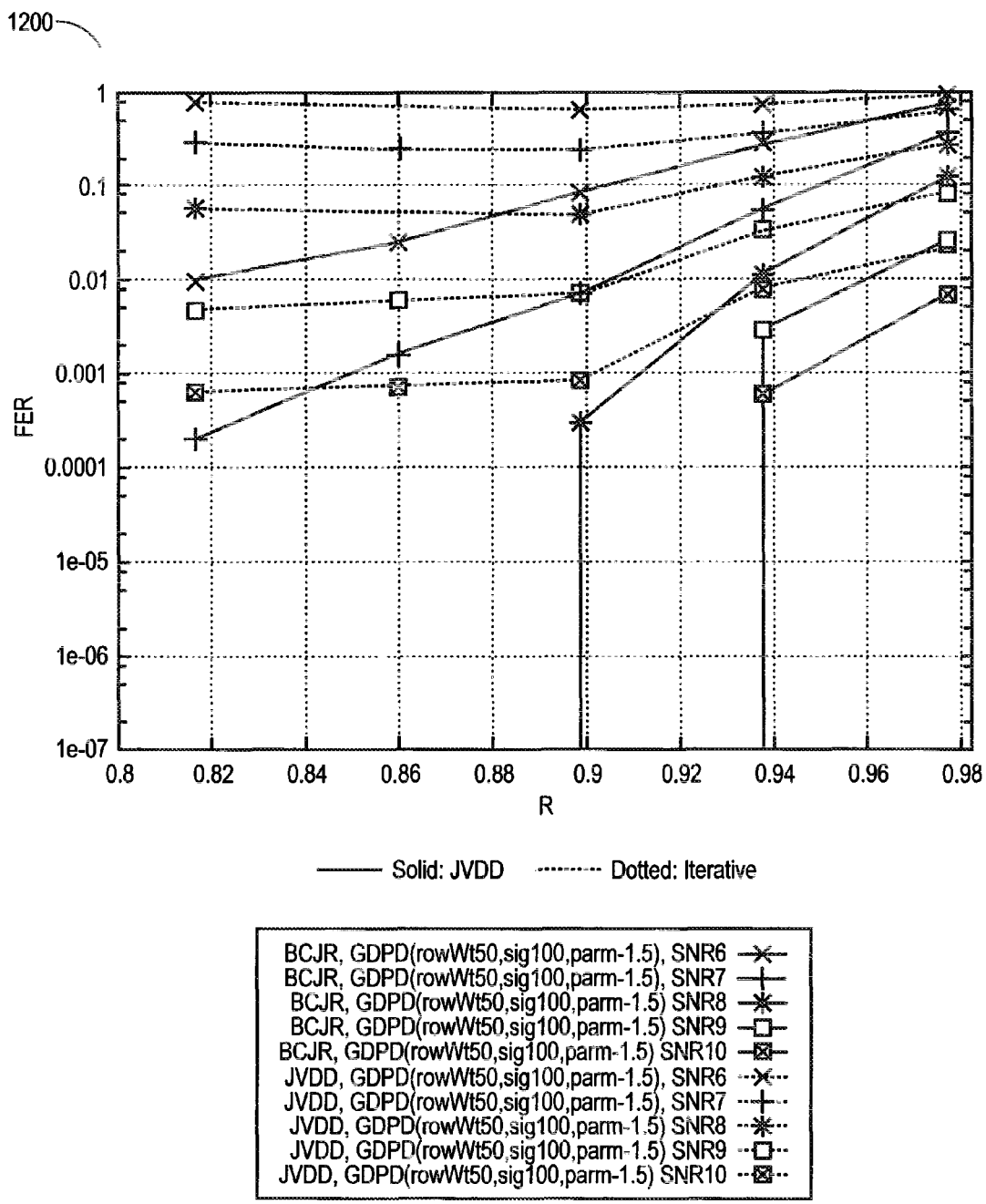
Figure 12:
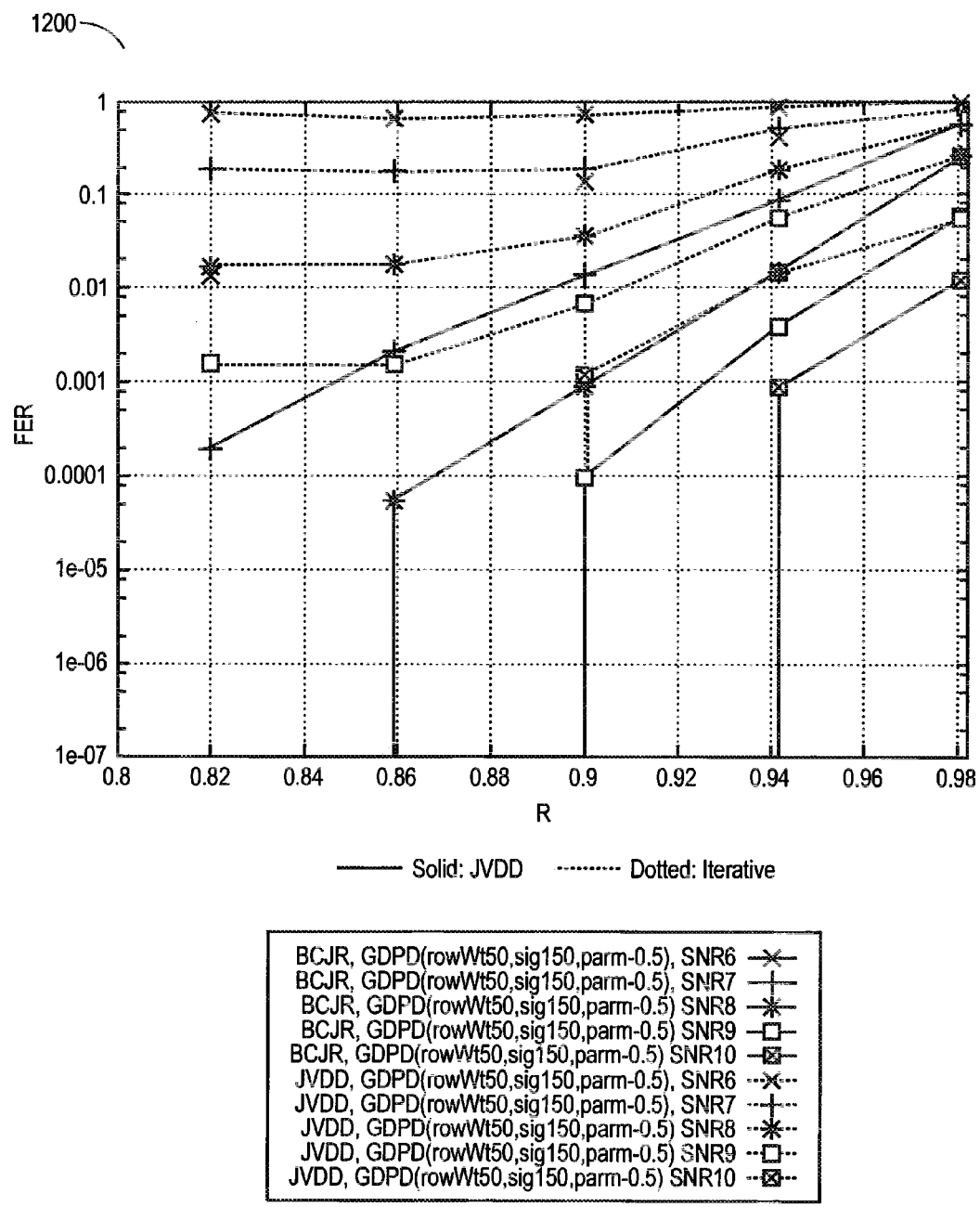

FIG. 12 shows an illustration 1200 of plots of FER vs code rate for JVDD and iterative detector/decoder when used with the following codes: random (left), GDLD-row_weight=50, σ=150, offset=100 (middle) and GDPD-row_weight=50, σ=100, ẏ=−1.5 (right), at CWL=256 (top) and CWL=512 (bottom). Threshold=2 and maxNoSurv=1000 may be maintained in these simulations. The different color schemes used represent different SNR values.

In FIG. 12, the top row corresponds to CWL=256 while CWL=512 is for the bottom set and R is varied for each type of code. The left, middle and right columns represent plots for random, GDLD and GDPD codes respectively.

Comparing across the 3 columns, the general trend observed is that the JVDD tends to perform better with the GDLD and GDPD codes at shorter CWLs while the iterative detector tends to perform better with random codes and at longer CWLs. This can be attributed to the fact that while random codes are good for the iterative system, they are less good for the JVDD as described above. For the random codes (left column), the JVDD does still outperform the iterative detector at the shorter CWL, especially towards the higher SNR's. At the longer CWL, the JVDD does not display the usual waterfall in performance at the low SNR's, but performs much better at the higher SNRs. This observation is attributed to the greater effect of maxNoSurv impairing the JVDD's performance at longer CWL due to increased JVDD demands on computational resources.

For the GDLD (center column) and GDPD (right column) simulations, the JVDD is winning in all the cases tested. The iterative detector in fact is performing quite poorly due to the existence of short cycles in the JVDD codes. This results in the rather flat performance observed with decreasing code rates of the iterative system. The JVDD on the other hand is not expected to be degraded by short-cycles, but the there is evidence of an error-floor in certain cases, such as the SNR=6 curve for CWL=256. This degradation may attribute to the maxNoSurv=1000 impeding the JVDD's performance when the computational demands becomes too large. Again, the trend may be observed that at longer CWL, the improvement with increasing SNR is more pronounced for the JVDD. It may be expect that the JVDD becomes closer to optimal at higher SNR's as fewer competing survivors make it inside the threshold leading to reduced complexity, which is always traded off for performance when the maxNoSurv and threshold parameters are accounted for.

According to various embodiments, novel joint detector and decoder, the JVDD, may be provided, that is shown to outperform the state-of the art iterative detector/decoder over an AWGN/ISI channel. The JVDD is conditionally an optimal detector/decoder, the condition being the sufficiency of computational resources. At short CWLs (≤512), it is found to be relatively easy to approach the optimal performance limit without incurring excessive computational complexity, but at longer CWLs, this becomes more of a challenge. The mechanism through which the JVDD fails to achieve optimality, is by discarding the MMLC during the metric thresholding portion of the method.

Based on the theoretical expected number of survivors in the JVDD trellis, according to various embodiments, several approaches through which the JVDD complexity can be managed may be provided. This includes appropriate selection of the threshold and maxNoSurv parameters, using JVDD codes, higher SNRs and lower code rates. The effect of these parameters on the average number of survivors in the JVDD trellis is also demonstrated and verified by the simulation results described above. The main challenge for the JVDD is achieving optimal performance at longer CWLs with reasonable complexities. For channels with shorter CWLs, the JVDD may win in all areas over the iterative detector and should be the algorithm of choice for any such applications.

According to various embodiments, the JVDD may be provided as an alternative to the commonly used iterative detector/decoder. In managing the computational complexity of the JVDD algorithm, two new classes of codes may be provided as alternatives to existing LDPC codes that are used with the iterative detector/decoder. These 'JVDD codes' are more suitable for the JVDD as they result in lower complexity when used with this algorithm. These codes however do not perform as well with the iterative detector, as their design makes no attempt to control the number of short cycles, which degrades the performance of the SPA decoder. The performance of the JVDD codes are dependent on the design parameters chosen for the codes. The effect of variations in these parameters on performance were investigated. In general, the JVDD does better with larger σ, ẏ (for GDPD) and offset (for GDLD), and at an optimal row_weight. In the code rate study conducted, the JVDD consistently performed better with JVDD codes than random codes, across the range of R tested. It was also shown to do better at lower R where there are more parity checks per bit as well as at higher SNR where there are fewer paths competing with the MMLC. At a longer CWL, however, the iterative detector/decoder gains ground and eventually outperforms the JVDD as the performance of the iterative system is enhanced at longer CWLs, whereas the JVDD suffers when the CWL is large as the number of survivors grows significantly with a longer trellis. Further work to improve the JVDD at longer CWLs is warranted.

Like Viterbi and BCJR, JVDD according to various embodiments may be is "optimal" over AWGN/ISI channels.

Devices and methods may be provided that can outperform the state-of-the-art iterative detector used in recording channels today at viable complexity, can in an optimum condition outperform the iterative detector, have a steeper waterfall region, may not have unwanted error-floors, may be conceptually simpler, and may be tunable using parameters for a complexity/performance tradeoff.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A joint detector/decoder device comprising:
    an input circuit configured to receive an input signal;
    a survivor splitting circuit configured to produce a plurality of survivors of a next instance based on at least one survivor of a previous instance and based on the input signal;
    a survivor discarding circuit configured to discard survivors based on a set of predetermined criteria;
    wherein each survivor has an associated bit sequence; and
    wherein the set of predetermined criteria comprises a parity check based on whether the survivor's bit pattern satisfies one or more checks of a parity check matrix.

2. The joint detector/decoder device of claim 1,
    wherein a survivor determination circuit comprising the survivor splitting circuit and the survivor discarding circuit is configured to determine that a survivor survives to the next instance if a metric of the survivor is less than a predetermined metric threshold.

3. The joint detector/decoder device of claim 2,
    wherein the metric comprises an Euclidean metric.

4. The joint detector/decoder device of claim 2,
    wherein the predetermined metric threshold is set to a minimum metric plus a constant user-definable threshold parameter.

5. The joint detector/decoder device of claim 1,
    wherein the survivor determination circuit is further configured to retain a predetermined set of survivors with smallest metrics as the plurality of survivors of the next instance.

6. The joint detector/decoder device of claim 1,
    wherein the parity check matrix comprises a matrix with entries of zero above a predetermined sub-diagonal of the parity check matrix.

7. The joint detector/decoder device of claim 1, further comprising:
    a metric determination circuit configured to determine a metric for survivor paths in a trellis.

8. A joint detection/decoding method comprising:
    receiving an input signal;
    producing a plurality of survivors of a next instance based on at least one survivor of a previous instance and based on the input signal;
    discarding survivors based on a set of predetermined criteria;
    wherein each survivor has an associated bit sequence; and
    wherein the set of predetermined criteria comprises a parity check based on whether the survivor's bit pattern satisfies one or more checks of a parity check matrix.

9. The joint detection/decoding method of claim 8, further comprising:
    determining that a survivor survives to the next instance if a metric of the survivor is less than a predetermined metric threshold.

10. The joint detection/decoding method of claim 9,
    wherein the metric comprises an Euclidean metric.

11. The joint detector/decoder method of claim 9,
    wherein the predetermined metric threshold is set to a minimum metric plus a constant user-definable threshold parameter.

12. The joint detection/decoding method of claim 8, further comprising:
    retaining a predetermined number of survivors with smallest metrics as the plurality of survivors of the next instance.

13. The joint detection/decoding method of claim 8,
    wherein the parity check matrix comprises a matrix with entries of zero above a predetermined sub-diagonal of the parity check matrix.

14. The joint detection/decoding method of claim 8, further comprising:
    determining, during a metric thresholding section, whether a survivor carries on to the next instance based on a metric of the bit sequence and independent from whether the bit sequence fulfills a predetermined validity criterion.

15. The joint detection/decoding method of claim 14, further comprising:
    determining, during a parity check section, whether a survivor carries on to the next instance based on a metric of the bit sequence and based on whether the bit sequence fulfills a predetermined validity criterion.

16. The joint detector/decoder method of claim 8, further comprising:
    determining a metric for survivor paths in a trellis.

* * * * *